US011208115B2

(12) United States Patent
Yoon et al.

(10) Patent No.: US 11,208,115 B2
(45) Date of Patent: Dec. 28, 2021

(54) METHOD OF ASSISTING AUTONOMOUS VEHICLE, AND APPARATUS THEREFOR

(71) Applicant: SAMSUNG ELECTRONICS CO., LTD., Suwon-si (KR)

(72) Inventors: Hyunsik Yoon, Suwon-si (KR); Sangyun Lee, Suwon-si (KR); Kibum Bae, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 184 days.

(21) Appl. No.: 16/539,312

(22) Filed: Aug. 13, 2019

(65) Prior Publication Data

US 2020/0047771 A1     Feb. 13, 2020

(30) Foreign Application Priority Data

Aug. 13, 2018   (KR) .................... 10-2018-0094612

(51) Int. Cl.
*B60W 50/08*     (2020.01)
*G05D 1/00*      (2006.01)
*B60W 50/00*     (2006.01)

(52) U.S. Cl.
CPC .......... *B60W 50/08* (2013.01); *G05D 1/0088* (2013.01); *B60W 2050/007* (2013.01);
(Continued)

(58) Field of Classification Search
CPC ............ B60W 50/08; B60W 2554/00; B60W 2556/00; B60W 2050/007;
(Continued)

(56) References Cited

U.S. PATENT DOCUMENTS

2007/0276600 A1\* 11/2007 King .................. G08G 1/166
                                                          701/301
2012/0010797 A1   1/2012 Luo et al.
(Continued)

FOREIGN PATENT DOCUMENTS

JP          4230341 B2    2/2009
JP          2012-2535 A   1/2012
(Continued)

OTHER PUBLICATIONS

English_Translation_KR20180071776A (Year: 2018).\*
(Continued)

*Primary Examiner* — Peter D Nolan
*Assistant Examiner* — Ashley L Redhead, Jr.
(74) *Attorney, Agent, or Firm* — Sughrue Mion, PLLC

(57) ABSTRACT

A method of assisting an autonomous vehicle includes obtaining first surrounding area information of the vehicle when the vehicle is located at a first distance from a monitored area disposed ahead of the vehicle, providing a first control command for controlling the vehicle to operate in a first operating mode, by using the first surrounding area information, obtaining second surrounding area information of the vehicle when the vehicle has driven toward the monitored area and is located at a second distance less than the first distance from the monitored area, and providing a second control command for controlling the vehicle to operate in a second operating mode, by using the second surrounding area information.

19 Claims, 22 Drawing Sheets

(52) U.S. Cl.
CPC ..... *B60W 2554/00* (2020.02); *B60W 2556/00* (2020.02); *G05D 2201/0213* (2013.01)

(58) Field of Classification Search
CPC ....... B60W 30/18163; B60W 2555/60; B60W 2556/65; B60W 2554/406; B60W 2554/804; B60W 30/18159; B60W 60/001; G05D 1/0088; G05D 2201/0213
See application file for complete search history.

(56) References Cited

U.S. PATENT DOCUMENTS

| | | | |
|---|---|---|---|
| 2013/0018572 A1 | 1/2013 | Jang | |
| 2018/0061231 A1* | 3/2018 | Publicover | G08G 1/0965 |
| 2018/0148036 A1 | 5/2018 | Gaither | |
| 2018/0203455 A1 | 7/2018 | Cronin et al. | |
| 2020/0013283 A1* | 1/2020 | Sato | G08G 1/09 |

FOREIGN PATENT DOCUMENTS

| | | | |
|---|---|---|---|
| JP | 2017-4471 A | | 1/2017 |
| KR | 1998-048020 U | | 9/1998 |
| KR | 10-1998-087804 A | | 12/1998 |
| KR | 10-1362706 B1 | | 2/2014 |
| KR | 10-2017-0015115 A | | 2/2017 |
| KR | 10-2018-0071776 A | | 6/2018 |
| KR | 20180071776 A | * | 6/2018 |
| WO | 2016/094224 A1 | | 6/2016 |
| WO | 2018/030082 A1 | | 2/2018 |

OTHER PUBLICATIONS

International Search Report and Written Opinion (PCT/ISA/210 and PCT/ISA/237), dated Nov. 26, 2019 by International Searching Authority in International Application No. PCT/KR2019/010319.
Communication dated Sep. 14, 2021, issued by the European Patent Office in European Application No. 19850615.6.

* cited by examiner

METHOD OF ASSISTING AUTONOMOUS VEHICLE, AND APPARATUS THEREFOR

CROSS-REFERENCE TO RELATED APPLICATION(S)

This application is based on and claims priority under 35 U.S.C. § 119 to Korean Patent Application No. 10-2018-0094612, filed on Aug. 13, 2018, in the Korean Intellectual Property Office, the disclosure of which is incorporated by reference herein in its entirety.

BACKGROUND

1. Field

The disclosure relates to a method of assisting an autonomous vehicle, and an apparatus therefor.

2. Description of Related Art

Autonomous vehicles and technologies capable of enabling autonomous driving currently attract much attention. For autonomous operation of a vehicle without manipulation of a driver, a technology for recognizing an external environment of the vehicle, a technology for determining an operation such as acceleration, stop, or bypass and determining a driving route by analyzing the recognized information, and a technology for controlling motion of the vehicle by using the determined information may be needed.

Additionally, for autonomous driving, a wireless communication technology is being developed. A connection technology for autonomous driving may include vehicle-to-something (V2X) and precise positioning. V2X is a wireless communication technology for connecting a vehicle on the road to nearby vehicles, traffic infrastructures, and pedestrians. V2X may include, for example, vehicle-to-vehicle (V2V) for communication between vehicles, vehicle-to-infrastructure (V2I) for communication between a vehicle and an infrastructure, and vehicle-to-pedestrian (V2P) for communication between a vehicle and a pedestrian.

During driving of an autonomous vehicle, various traffic environment conditions need to be considered. Particularly, in a congested area, an autonomous vehicle needs to adaptively drive in consideration of a driving status of nearby vehicles. For example, the autonomous vehicle cannot enter an intersection due to vehicles tailgating in a different direction. In this case, the autonomous vehicle needs to proactively determine a congestion status of the intersection and actively drive through the congested area in consideration of a congestion level.

SUMMARY

Additional aspects will be set forth in part in the description which follows and, in part, will be apparent from the description, or may be learned by practice of the presented embodiments of the disclosure.

In accordance with an aspect of the disclosure, a method, performed by an electronic device, of assisting driving of a vehicle includes obtaining first surrounding area information of the vehicle when the vehicle is located at a first distance from a monitored area ahead, providing a first control command for controlling the vehicle to operate in a first operating mode among a plurality of operating modes, by using the obtained first surrounding area information, obtaining second surrounding area information of the vehicle when the vehicle drives toward the monitored area and is located at a second distance less than the first distance from the monitored area, and providing a second control command for controlling the vehicle to operate in a second operating mode among the plurality of operating modes, by using the obtained second surrounding area information.

In accordance with an aspect of the disclosure, a driving method of a vehicle includes sensing objects near the vehicle when the vehicle is located at a first distance from a monitored area ahead, determining a first operating mode among a plurality of operating modes of the vehicle by using first surrounding area information based on sensed values, changing at least one of a speed or a direction of the vehicle to drive toward the monitored area based on the first operating mode, sensing objects near the vehicle when the vehicle drives toward the monitored area and is located at a second distance less than the first distance from the monitored area, determining a second operating mode among the plurality of operating modes of the vehicle by using second surrounding area information based on sensed values, and changing at least one of the speed or the direction of the vehicle to pass through the monitored area based on the second operating mode.

In accordance with an aspect of the disclosure, an electronic device includes an information obtainer configured to obtain surrounding area information of a vehicle, an operation determiner configured to determine a first operating mode among a plurality of operating modes by using first surrounding area information of the vehicle, the first surrounding area information being obtained by the information obtainer when the vehicle is located at a first distance from a monitored area ahead, and determine a second operating mode among the plurality of operating modes by using second surrounding area information of the vehicle, the second surrounding area information being obtained by the information obtainer when the vehicle is located at a second distance less than the first distance from the monitored area, and a command provider configured to provide a first control command for controlling the vehicle to operate in the determined first operating mode, or a second control command for controlling the vehicle to operate in the determined second operating mode.

In accordance with an aspect of the disclosure, a vehicle includes a sensor configured to sense objects near the vehicle, an electronic device configured to determine a first operating mode among a plurality of operating modes by using first surrounding area information based on values sensed by the sensor, when the vehicle is located at a first distance from a monitored area ahead, determine a second operating mode among the plurality of operating modes by using second surrounding area information based on values sensed by the sensor, when the vehicle is located at a second distance less than the first distance from the monitored area, and a driving unit configured to change at least one of a speed or a direction of the vehicle based on the determined first or second operating mode.

In accordance with an aspect of the disclosure, a computer program product includes a computer-readable storage medium storing instructions, which, when executed by a processor, causes an electronic device to obtain first surrounding area information of a vehicle when the vehicle is located at a first distance from a monitored area ahead, provide a first control command for controlling the vehicle to operate in a first operating mode among a plurality of operating modes, by using the obtained first surrounding area information, obtain second surrounding area information of the vehicle when the vehicle drives toward the monitored area and is located at a second distance less than the first distance from the monitored area, and provide a second control command for controlling the vehicle to operate in a second operating mode among the plurality of operating modes, by using the obtained second surrounding area information.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1A:
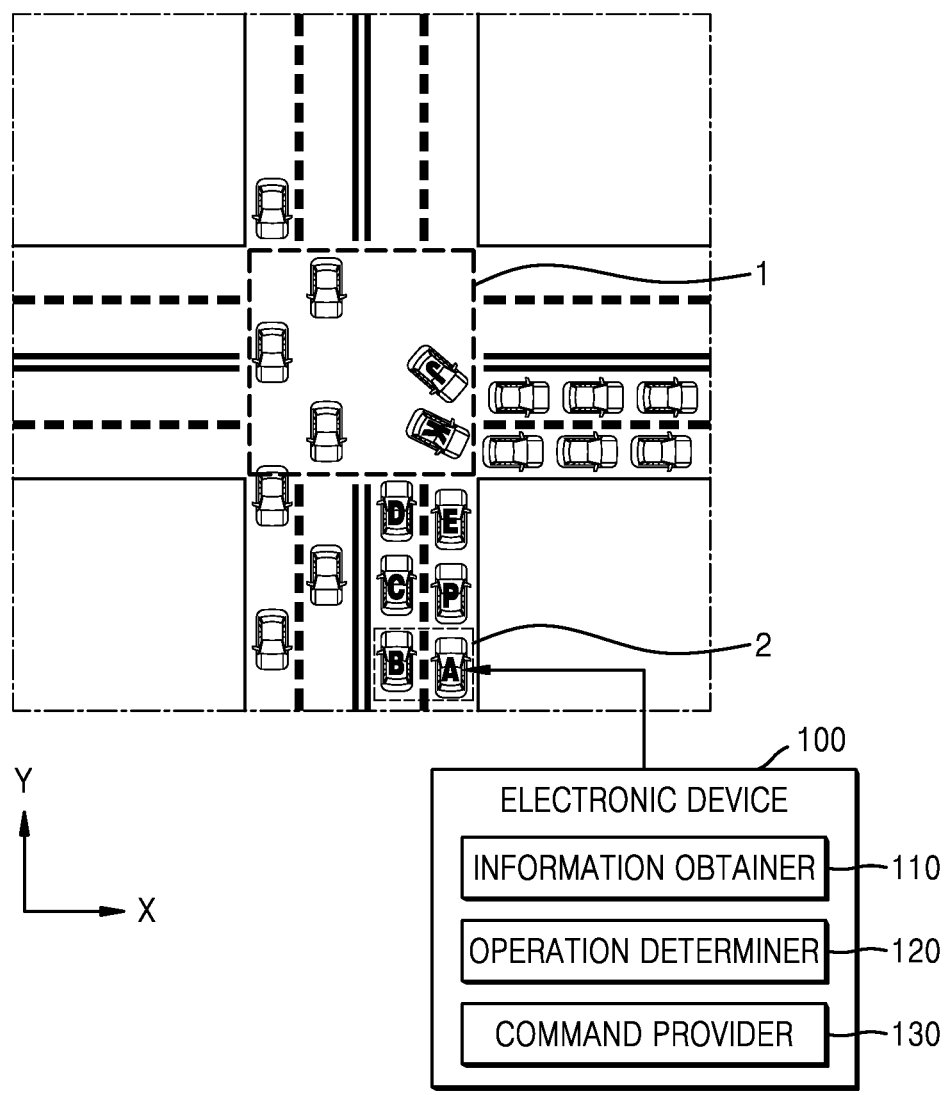
FIGS. 1A and 1B illustrate a vehicle scheduled to drive through a monitored area, according to an embodiment.

Terminology used in this specification will now be briefly described before describing the disclosure in detail.

Although the terms used herein are selected, as much as possible, from general terms that are widely used at present while taking into consideration the functions obtained in accordance with the disclosure, these terms may be replaced by other terms based on intentions of one of ordinary skill in the art, customs, emergence of new technologies, or the like. In a particular case, terms that are arbitrarily selected by the applicant may be used and, in this case, the meanings of these terms may be described in corresponding parts of the detailed description. Therefore, it is noted that the terms used herein are construed based on practical meanings thereof and the whole content of this specification, rather than being simply construed based on names of the terms.

It will be understood that the terms "comprises", "comprising", "includes" and/or "including", when used herein, specify the presence of stated elements, but do not preclude the presence or addition of one or more other elements. The term " . . . unit" or " . . . module" is used to denote an entity for performing at least one function or operation, and may be implemented using hardware, software, or a combination of hardware and software.

Hereinafter, the disclosure will be described in detail by explaining embodiments of the disclosure with reference to the attached drawings. The disclosure may, however, be embodied in many different forms and is not construed as being limited to the embodiments of the disclosure set forth herein. In the drawings, parts not related to embodiments of the disclosure are not illustrated for clarity of explanation, and like reference numerals denote like elements throughout.

In the following description, an electronic device may refer to a device for setting a driving route of a vehicle, by recognizing a surrounding environment of the vehicle. The vehicle may be a vehicle capable of autonomous driving, but is not limited thereto. For example, the vehicle may be a vehicle using an advanced driver assistance system (ADAS). The electronic device may be an ADAS or a part of the ADAS. Alternatively, the electronic device may be a control device for electronically controlling various functions related driving of a vehicle, e.g., an electronic control unit (ECU), or a part of the control device. When the electronic device is an external device mounted on a vehicle, the electronic device may be, for example, a driver assistance device such as an on-board diagnostics (OBD) device connected to a vehicle connector (e.g., an OBD terminal or an OBD connector), or a navigation system, or a part thereof. The electronic device may include at least one of a smartphone, a tablet PC, a mobile phone, a video phone, an e-book reader, a desktop PC, a laptop PC, a netbook computer, a workstation, a server, a personal digital assistant (PDA), a portable multimedia player (PMP), or an MP3 player. The electronic device may include at least one of, for example, a television, a digital video disc (DVD) player, or an electronic photo frame. As used herein, the term "user" may refer to a person who uses the electronic device or a device using the electronic device (e.g., an artificial intelligence (AI) electronic device).

Throughout the disclosure, the expression "at least one of a, b, or c" indicates only a, only b, only c, both a and b, both a and c, both b and c, all of a, b, and c, or variations thereof.

Figure 1B:
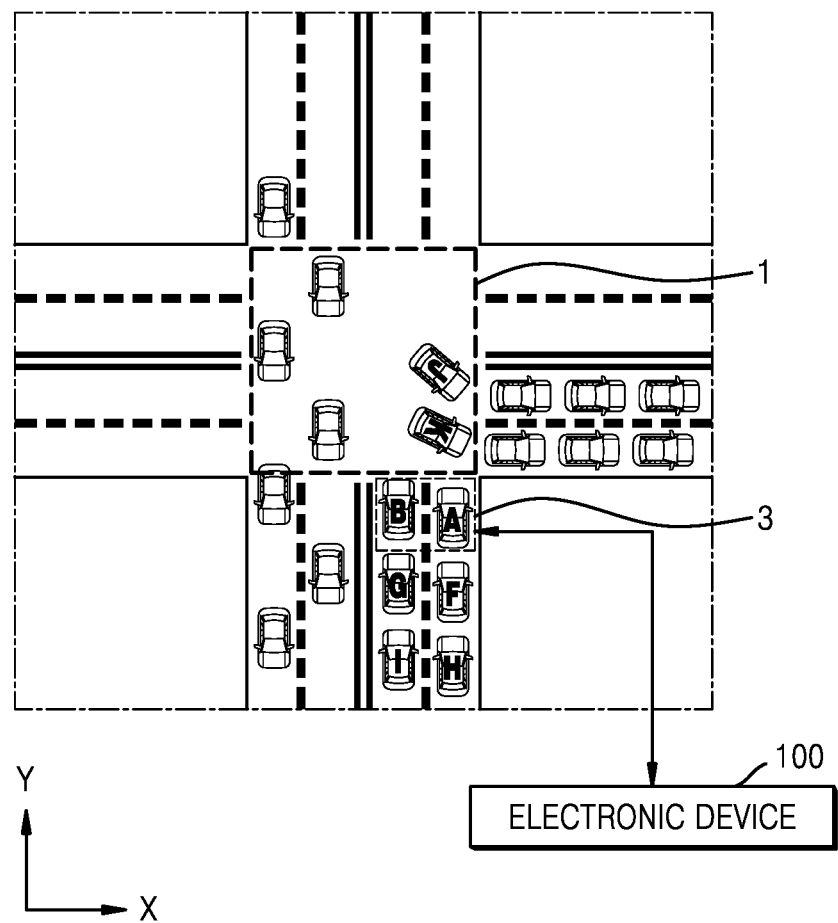

FIGS. 1A and 1B illustrate a vehicle A scheduled to drive through a monitored area 1, according to an embodiment.

In FIGS. 1A and 1B, the vehicle A may be scheduled to drive straight through the monitored area 1. The monitored area 1 may be an area which entails careful driving or disturbs driving of the vehicle A. The monitored area 1 may include, for example, an intersection, an accident-prone area, a congested area, or a pedestrian protection zone, but is not limited thereto.

In FIGS. 1A and 1B, the monitored area 1 may be, for example, a crossing area of a four-way intersection. According to embodiments, the monitored area 1 may include the crossing area and a part of a Y-direction road or a part of an X-direction road. Alternatively, the monitored area 1 may include only a part of the crossing area.

The vehicle A may include an electronic device 100. According to embodiments, the vehicle A may further include at least one of a sensor, an input device, a storage, a communicator, a driving unit, or an output device. The sensor, the input device, the storage, the communicator, the driving unit, and the output device of the vehicle A are described in detail below with reference to FIG. 15.

In FIGS. 1A and 1B, the monitored area 1 may be in a state in which vehicles J and K are tailgating from an X direction crossing a Y direction in which the vehicle A is scheduled to drive, and thus vehicles which are scheduled to drive straight through the intersection in the Y direction are tied up.

The vehicle A may be located in a first area 2 spaced apart from a point of the monitored area 1 by a first distance (e.g., a longer distance) as illustrated in FIG. 1A, or be located in a second area 3 spaced apart from the monitored area 1 by a second distance (e.g., a short distance which is shorter than the first distance) as illustrated in FIG. 1B.

In this case, the sensor of the vehicle A may sense objects near the vehicle A. The objects may include, for example, at least one of nearby vehicles, intersections, stop lines, road markings, road structures, roundabouts, traffic lights, traffic signs, bypasses, or pedestrians. The nearby vehicles may include, for example, vehicles driving behind or in front of the vehicle A on the same lane as the vehicle A, vehicles driving on a lane adjacent to the lane of the vehicle A, vehicles changing to an adjacent lane of the vehicle A, or vehicles driving on a lane adjacent to an adjacent lane of the vehicle A, but is not limited thereto.

The sensor may sense the objects, and obtain the sensed values in real time or periodically while the vehicle A is driving. The sensed values may include, for example, a front camera image, a rear camera image, a side camera image, a radar sensed value, a lidar sensed value, an ultrasonic sensed value, or an infrared sensed value, but is not limited thereto. According to embodiments, the vehicle A may recognize at least one external vehicle by using vehicle-to-something (V2X) technology (e.g., dedicated short-range communications (DSRC) or wireless access in vehicular environments (WAVE)). For example, the vehicle A may receive a packet broadcasted or advertised by the at least one external vehicle in a certain time cycle, and determine a relative location of the at least one external vehicle by analyzing the received packet. In this case, the packet broadcasted or advertised by the at least one external vehicle may include, for example, identification information and location information of the at least one external vehicle.

The sensor may sense a location of the vehicle A. For example, the sensor may sense the location of the vehicle A by using at least one location sensor (e.g., a global positioning system (GPS), a differential GPS (DGPS), or an inertial navigation system (INS)). According to embodiments, when the sensor includes an image sensor or a lidar sensor, the sensor may sense the location of the vehicle A based on a landmark recognized using the image sensor or the lidar sensor. In this case, the vehicle A may obtain a current location of the vehicle A by comparing the value sensed by the image sensor or the lidar sensor, to a detailed map stored in or retrieved by the vehicle A.

The electronic device 100 may determine whether the vehicle A is located at the first or second distance from the monitored area 1, based on the location of the vehicle A obtained by the sensor of the vehicle A. For example, when the vehicle A is located beyond a critical distance from the monitored area 1, the electronic device 100 may determine that the vehicle A is located in the first area 2 spaced apart from the monitored area 1 by the first distance. When the vehicle A is located within the critical distance from the monitored area 1, the electronic device 100 may determine that the vehicle A is located in the second area 3 spaced apart from the monitored area 1 by the second distance. For example, the critical distance may be determined in consideration of a recognition range of at least one sensor installed on the vehicle A or a short-range communication range of the vehicle A. As another example, the critical distance may be a distance pre-defined by a user or a driving route setting system.

Specifically, the electronic device 100 may determine approach of the vehicle A to the monitored area 1. The electronic device 100 may determine approach of the vehicle A to the monitored area 1 based on at least one of a map of a surrounding area of the vehicle A, the current location of the vehicle A, or a driving direction of the vehicle A. When the vehicle A approaches to the first distance from the monitored area 1 (e.g., within 100 m from the intersection), the electronic device 100 may determine that the vehicle A is located at the first distance from the monitored area 1. When the vehicle A approaches to the second distance from the monitored area 1 (e.g., within 10 m from the intersection), the electronic device 100 may determine that the vehicle A is located at the second distance from the monitored area 1.

When the result of determining approach of the vehicle A to the monitored area 1 indicates that the vehicle A is located in the first area 2 spaced apart from the monitored area 1 by the first distance as illustrated in FIG. 1A, an information obtainer 110 of the electronic device 100 may obtain first surrounding area information of the vehicle A. When the vehicle A is located in the second area 3 spaced apart from the monitored area 1 by the second distance as illustrated in FIG. 1B, the information obtainer 110 of the electronic device 100 may obtain second surrounding area information of the vehicle A.

According to embodiments, the electronic device 100 may divide a distance, e.g., a predetermined distance, from the monitored area 1 to the vehicle A into a plurality of areas based on a sensing range (or a sensing capability) of the sensor of the vehicle A. In this case, when the first distance at which the vehicle A is located from the monitored area 1 is in a first area among the plurality of areas, the information obtainer 110 of the electronic device 100 may obtain the first surrounding area information of the vehicle A. When the second distance at which the vehicle A is located from the monitored area 1 is in a second area among the plurality of areas, the information obtainer 110 of the electronic device 100 may obtain the second surrounding area information of the vehicle A.

The first surrounding area information and the second surrounding area information may be values sensed by the sensor of the vehicle A, or information obtained by processing the sensed values. Alternatively, the first surrounding area information and the second surrounding area information may be analysis results obtained by analyzing the sensed values. The first surrounding area information and the second surrounding area information may include at least one of traffic signal information, driving information of nearby vehicles, or nearby traffic sign information.

According to embodiments, the first surrounding area information may be information about the objects sensed by the sensor of the vehicle A at the first distance, and the second surrounding area information may be information about the objects sensed by the sensor of the vehicle A at the second distance. Specifically, the electronic device 100 may identify an attribute of the sensed objects as being static or dynamic. For example, when the objects include a traffic light or a traffic sign, the electronic device 100 may identify the attribute of the objects as being static. When the objects include vehicles, the electronic device 100 may identify the attribute of the objects as being dynamic. The electronic device 100 may determine surrounding area information in consideration of the attribute of the objects. For example, when the objects include a traffic light or a traffic sign, the electronic device 100 may determine, for example, a status value (e.g., the color of the traffic light or the instruction or information of the traffic sign) or a cycle value (e.g., a lighting cycle) as the surrounding area information. When the objects include vehicles, the electronic device 100 may determine, for example, a motion value of the objects (e.g., a driving speed or a driving direction) or a density or a dispersion of the objects as the surrounding area information.

When the information obtainer 110 of the electronic device 100 obtains the first surrounding area information or the second surrounding area information of the vehicle A, the operation determiner 120 of the electronic device 100 may determine an operating mode of the vehicle A. For example, when the vehicle A is located at the first distance from the monitored area 1 as illustrated in FIG. 1A, the operation determiner 120 of the electronic device 100 may determine a first operating mode among a plurality of operating modes of the vehicle A by using the first surrounding area information of the vehicle A, which is obtained by the information obtainer 110. When the vehicle A is located at the second distance less than the first distance from the monitored area 1 as illustrated in FIG. 1B, the operation determiner 120 may determine a second operating mode among the plurality of operating modes by using the second surrounding area information of the vehicle A, which is obtained by the information obtainer 110.

When the first or second operating mode is determined, a command provider 130 of the electronic device 100 may provide a control command to the driving unit of the vehicle A to operate the vehicle A in the determined first or second operating mode.

Although not shown in FIGS. 1A and 1B, the driving route setting system of the vehicle A including the electronic device 100 may further include a server. In this case, according to an embodiment, the electronic device 100 may transmit the surrounding area information (e.g., image information of a surrounding area of the vehicle A) obtained by the sensor, to the server, and receive a recognition result of the surrounding area information from the server. For example, the server may store a model trained using an AI algorithm. In this case, when the image information is received, the server may recognize the image information by using the trained model, and transmit the recognition result to the electronic device 100.

According to embodiments, the electronic device 100 may include the information obtainer 110 configured to obtain the surrounding area information of the vehicle A, the operation determiner 120 configured to determine the first operating mode among the plurality of operating modes by using the first surrounding area information of the vehicle A, which is obtained by the information obtainer 110, when the vehicle A is located at the first distance from the monitored area 1 ahead, and determine the second operating mode among the plurality of operating modes by using the second surrounding area information of the vehicle A, which is obtained by the information obtainer 110, when the vehicle A is located at the second distance less than the first distance from the monitored area 1, and the command provider 130 configured to provide a first control command for controlling the vehicle A to operate in the determined first operating mode, or a second control command for controlling the vehicle A to operate in the determined second operating mode.

The command provider 130 may provide the first control command for controlling the vehicle A to operate in an autonomous driving mode for driving along a first driving route set to enter the monitored area 1, or provide the first control command for controlling the vehicle A to operate in an autonomous driving mode for driving along a second driving route set to bypass the monitored area 1.

The command provider 130 may provide the second control command for controlling the vehicle A to continuously operate in an autonomous driving mode, or provide the second control command for controlling the vehicle A to operate in a driver driving mode in which the vehicle A is driven by a driver.

The command provider 130 may provide the second control command for controlling the vehicle A to operate in an autonomous driving mode for driving along a first driving route set to enter the monitored area 1, provide the second control command for controlling the vehicle A to operate in an autonomous driving mode for waiting to enter the monitored area 1, or provide the second control command for controlling the vehicle A to operate in an autonomous driving mode for driving along a second driving route set to bypass the monitored area 1.

The information obtainer 110 may further obtain location information of the vehicle A, and the command provider 130 may provide the first control command for controlling the vehicle A to operate in the first operating mode among the plurality of operating modes, by using the first surrounding area information and the location information.

The information obtainer 110 may further obtain a driving history of the vehicle A, and the command provider 130 may provide the first control command for controlling the vehicle A to operate in the first operating mode among the plurality of operating modes, by using the first surrounding area information and the driving history.

The electronic device 100 may further include a notification provider configured to provide notification information indicating that the vehicle A operates in the first or second operating mode.

Figure 2:
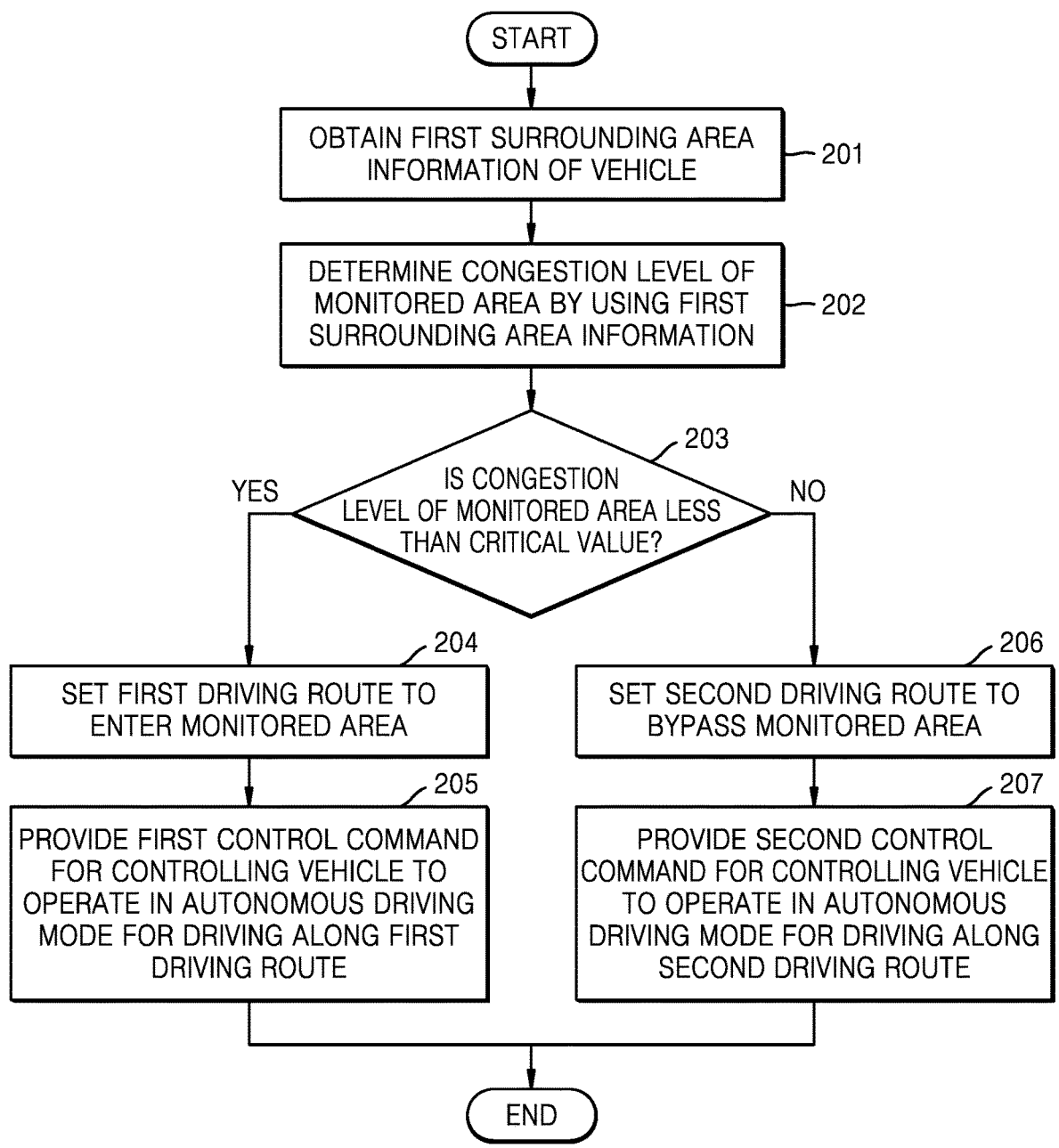
FIG. 2 is a flowchart of a method, performed by an electronic device, of controlling a vehicle, according to an embodiment.

FIG. 2 is a flowchart of a method, performed by the electronic device 100, of controlling the vehicle A, according to an embodiment.

Figure 3A:
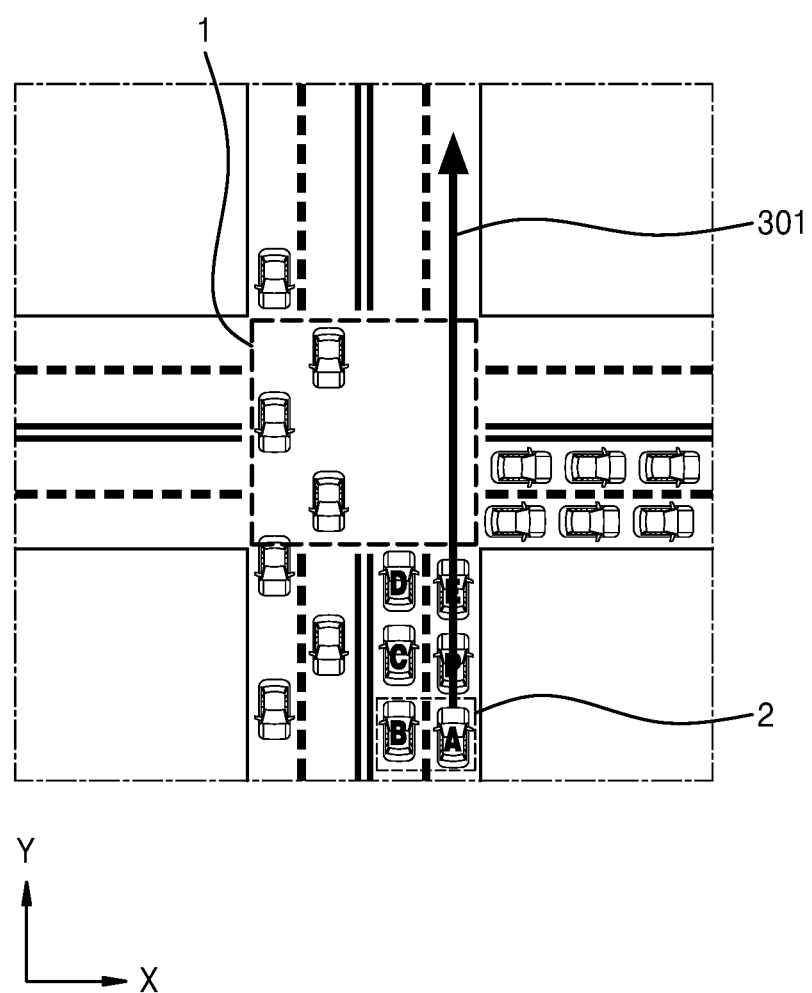
FIGS. 3A and 3B illustrate a vehicle driving through a monitored area along a driving route, according to an embodiment.
Figure 3B:
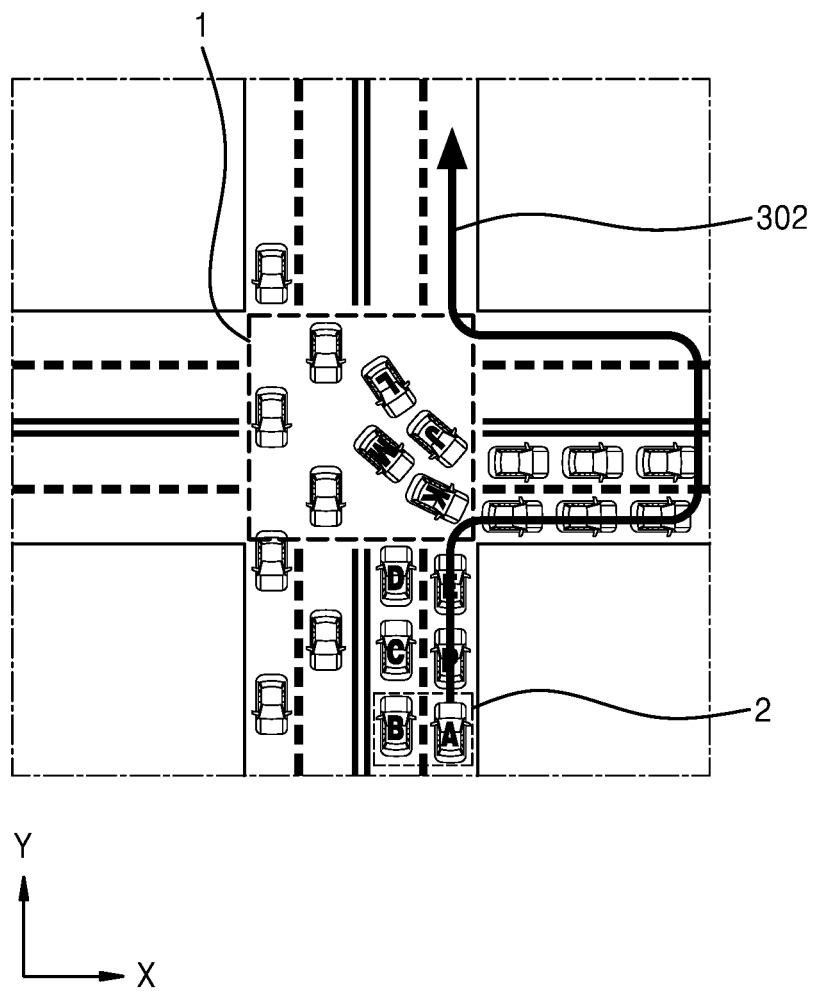

In FIG. 2, the vehicle A may be located in the first area 2 spaced apart from the monitored area 1 (e.g., an intersection) ahead, by a first distance (e.g., a long distance) as illustrated in FIGS. 3A and 3B.

In this case, in operation 201, the electronic device 100 may obtain first surrounding area information of the vehicle A located at the first distance. The first surrounding area information may include, for example, traffic signal information (e.g., traffic light information of an intersection) or driving information of nearby vehicles (e.g., a driving speed or a driving direction).

In operation 202, the electronic device 100 may determine a congestion level of the monitored area 1 by using the first surrounding area information.

In operation 203, the electronic device 100 may determine whether the congestion level of the monitored area 1 is less than a critical value, e.g., a threshold value.

When the congestion level of the monitored area 1 is less than the critical value, in operation 204, the electronic device 100 may set a first driving route to enter the monitored area 1. The set first driving route may include, for example, a route for entering the monitored area 1 while maintaining a current lane or by changing to another lane (e.g., a left lane less influenced by tailgating). For example, the electronic device 100 may set a first driving route 301 as illustrated in FIG. 3A. In operation 205, the electronic device 100 may provide, to the driving unit of the vehicle A, a first control command for controlling the vehicle A to operate in an autonomous driving mode for driving along the set first driving route 301.

When the congestion level of the monitored area 1 is equal to or greater than the critical value, in operation 206, the electronic device 100 may set a second driving route to bypass the monitored area 1. The set second driving route may include, for example, a route for maintaining a current lane or changing to another lane (e.g., a left lane less influenced by tailgating) before bypassing. For example, the electronic device 100 may set a second driving route 302 as illustrated in FIG. 3B. In operation 207, the electronic device 100 may provide, to the driving unit of the vehicle A, a second control command for controlling the vehicle A to operate in an autonomous driving mode for driving along the set second driving route 302.

The electronic device 100 may determine the congestion level of the monitored area 1 (e.g., an intersection) by using the first surrounding area information in various manners.

According to an embodiment, the first surrounding area information may be traffic signal information, and include traffic light information of an intersection located in a driving direction of the vehicle A. The electronic device 100 may determine a congestion level of the intersection based on a driving speed or a driving distance of the vehicle A during a duration of a traffic light (e.g., a duration of a green light) located at the intersection in the driving direction. Specifically, when a driving speed of the vehicle A is equal to or less than 10 km/h during a duration of a green light at a location 50 m ahead of the vehicle A, the electronic device 100 may determine that the congestion level of the intersection is high due to, for example, tailgating.

According to embodiments, the electronic device 100 may determine the congestion level of the monitored area 1 by using the first surrounding area information and location information of the vehicle A. For example, the electronic device 100 may determine the congestion level of the monitored area 1 by using a change in speed relative to nearby vehicles (e.g., vehicles in front), a distance to an intersection, and a status of a traffic light located in a driving direction.

The change in speed relative to the nearby vehicles may include, for example, a speed variation of the nearby vehicles during a certain period of time (e.g., a speed variation from 60 km/h to 15 km/h during the last 3 seconds). The status of the traffic light may include at least one of, for example, an arrow direction of the traffic light, color information of the traffic light (e.g., green, red, or yellow), a lighting cycle of the traffic light, or a remaining time of the traffic light (e.g., a time remaining before a current green light changes to a yellow light (or a red light)).

In this case, when the status of the traffic light includes a remaining time of a green light, the electronic device 100 may determine the congestion level of the intersection by using the remaining time of the green light, the change in speed relative to the nearby vehicles, and the distance to the intersection. For example, when the vehicle A may enter the intersection from the first distance within the remaining time, the electronic device 100 may determine the congestion level of the intersection to be low (e.g., a value of 0). Upon determining that the traffic light is to change from green to yellow when the vehicle A drives to a stop line, the electronic device 100 may determine the congestion level of the intersection to be medium (e.g., a value of 1). Upon determining that the vehicle A cannot easily enter the intersection, the electronic device 100 may determine the congestion level of the intersection to be high (e.g., a value of 2).

Alternatively, as the status of the traffic light, when the remaining time of the green light is unknown, the electronic device 100 may determine the congestion level of the intersection by using the change in speed relative to the nearby vehicles and the distance to the intersection. In this case, because the traffic light may change to yellow at any time, the electronic device 100 may determine the congestion level of the intersection to be medium (e.g., a value of 1) or high (e.g., a value of 2).

Alternatively, when the status of the traffic light cannot be identified, the electronic device 100 may determine the congestion level of the intersection by using at least one of the change in speed relative to the nearby vehicles or the distance to the intersection. For example, the electronic device 100 may determine the congestion level of the intersection to be high (e.g., a value of 2). In addition, the electronic device 100 may set a driving route to drive to a location at which the vehicle A may identify the status of the traffic light (e.g., near a stop line).

According to embodiments, the electronic device 100 may determine the congestion level of the monitored area 1 by using the first surrounding area information and the location information of the vehicle A. For example, the electronic device 100 may use, for example, a speed of nearby vehicles (e.g., vehicles in front), an average travel distance of the nearby vehicles per second (e.g., a travel distance during the last 3 seconds), a distance to an intersection, a status of a traffic light located at the intersection in a driving direction of the vehicle A, and a duration of a green light (e.g., a time during which the green light is continuously turned on). In this case, the speed of the nearby vehicles and the average travel distance of the nearby vehicles per second may be values relative to a speed of the vehicle A and an average travel distance of the vehicle A per second.

In this case, when the status of the traffic light indicates a green light, upon determining that '(the average travel distance of the nearby vehicles per second×the duration of the green light)>the distance to the intersection', the electronic device 100 may determine that the intersection is not congested. Upon determining that '(the average travel distance of the nearby vehicles per second×the duration of the green light)<the distance to the intersection', the electronic device 100 may determine the congestion level of the intersection to be low (e.g., a value of 0). Upon determining that '(the average travel distance of the nearby vehicles per second×the duration of the green light)×2<the distance to the intersection', the electronic device 100 may determine the congestion level of the intersection to be medium (e.g., a value of 1). Upon determining that '(the average travel distance of the nearby vehicles per second×the duration of the green light)×3<the distance to the intersection', the electronic device 100 may determine the congestion level of the intersection to be high (e.g., a value of 2).

Based on the distance to the intersection, the nearby vehicles and the vehicle A may actually start driving after a certain period of time from when the status of the traffic light changes to a green light. Therefore, the above-described duration of the green light may be replaced by an actual driving time at which the nearby vehicles or the vehicle A may actually start driving after the green light is turned on. To this end, the electronic device 100 may calculate the actual driving time by predicting a distance from the intersection to the nearby vehicles and driving information of the nearby vehicles, or a distance from the intersection to the vehicle A and driving information of the vehicle A.

According to embodiments, the electronic device 100 may determine the congestion level of the intersection by using a driving history of the vehicle A. The electronic device 100 may compare a previous history of a high congestion level of the intersection (e.g., tailgating situations at the intersection) to a current driving status of the vehicle A. For example, when the traffic light in the driving direction is green, upon determining that a predicted arrival time to be taken until the vehicle A at a current location arrives the intersection is similar to or longer than an arrival time of the vehicle A in a previous case corresponding to a high congestion level, the electronic device 100 may determine that the congestion level of the intersection is high. Alternatively, when a speed of the vehicle A at the current location is similar to or less than a previous speed of the vehicle A at the location, the electronic device 100 may determine that the congestion level of the intersection is high.

Specifically, the electronic device 100 may use previous congestion levels of the intersection at a location and/or a time similar to or the same as the current location of the vehicle A and/or a current time. For example, the electronic device 100 may predict a congestion probability of the intersection by calculating 'the number of times corresponding to a high congestion level of the intersection during the last month'. For example, when the congestion probability is equal to or greater than 1, the electronic device 100 may predict that a current congestion level of the intersection is high. The previous congestion levels of the intersection or the congestion probability of the intersection, which is calculated based on the previous congestion levels, may be obtained from an external server or a memory of the vehicle A, which collects historical congestion level data of the intersection.

Figure 4:
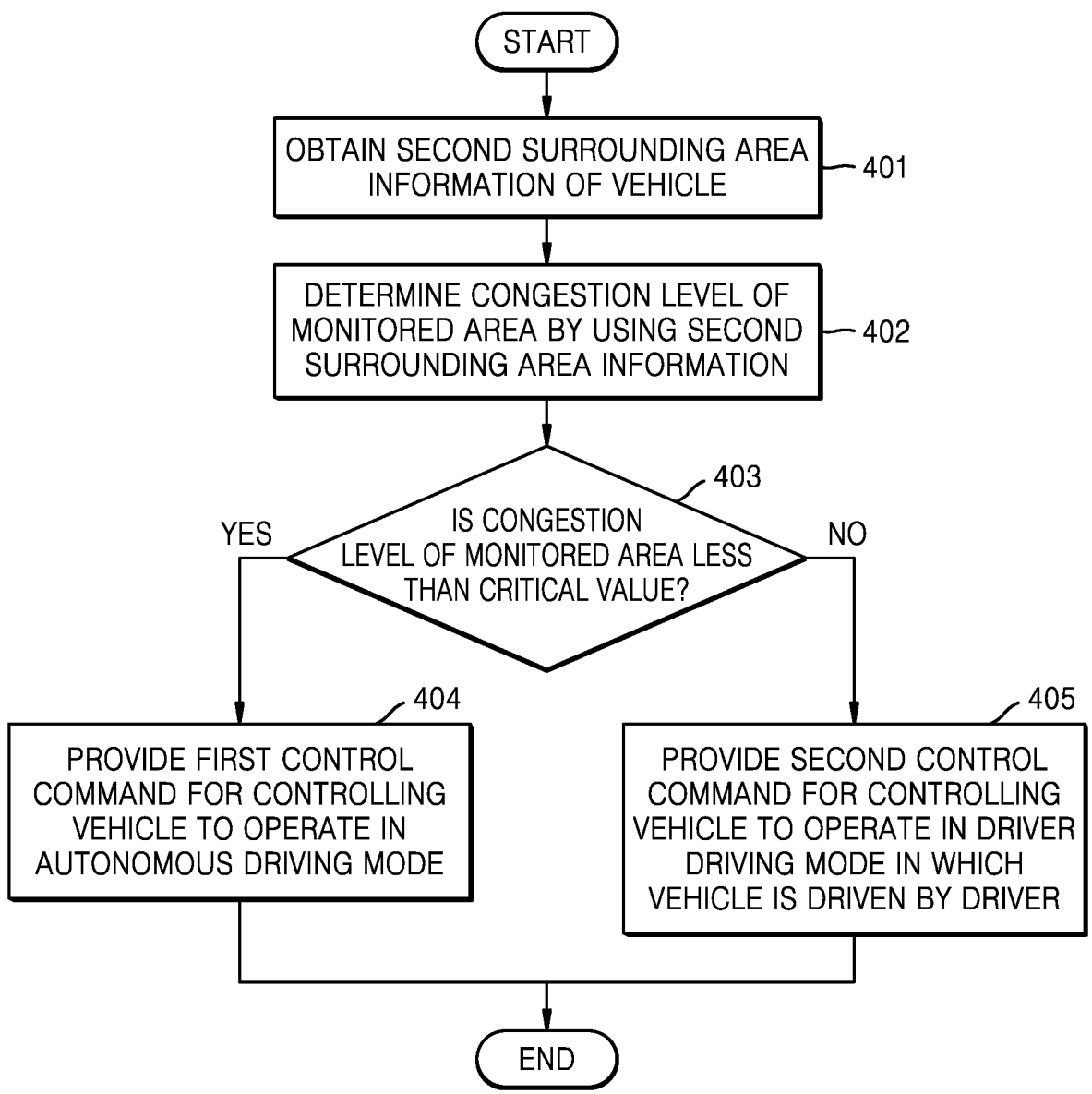
FIG. 4 is a flowchart of a method, performed by an electronic device, of controlling a vehicle, according to an embodiment.

FIG. 4 is a flowchart of a method, performed by the electronic device 100, of controlling the vehicle A, according to an embodiment.

Figure 6A:
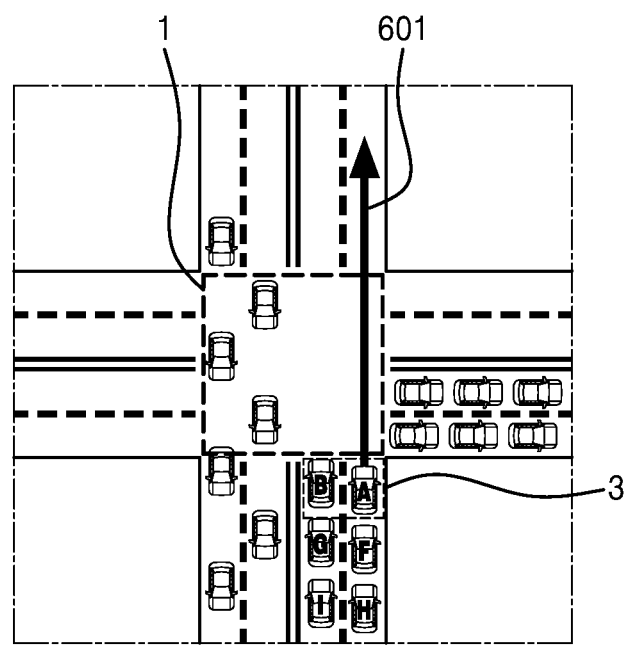
FIGS. 6A, 6B, and 6C illustrate a vehicle driving through a monitored area along a driving route, according to an embodiment.
Figure 6B:
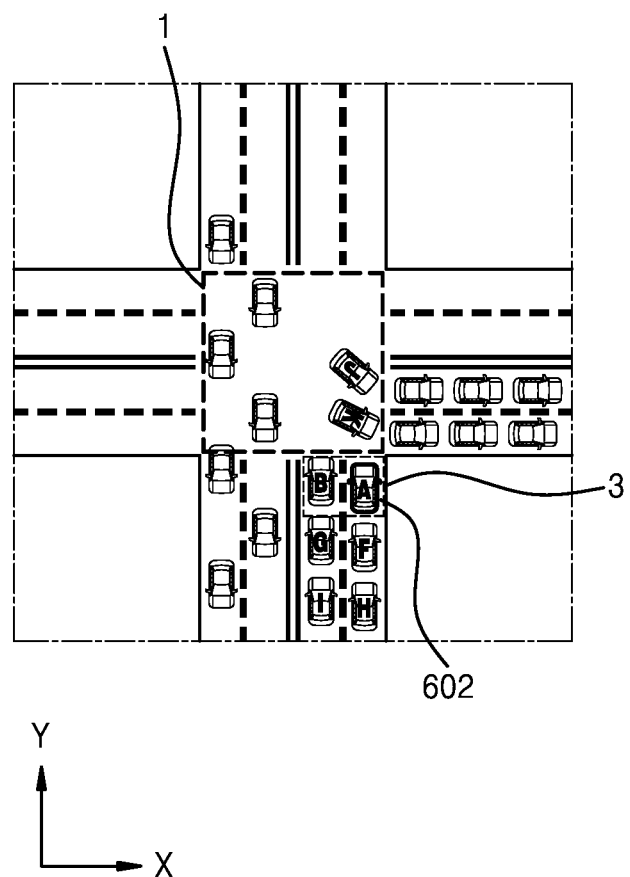
Figure 6C:
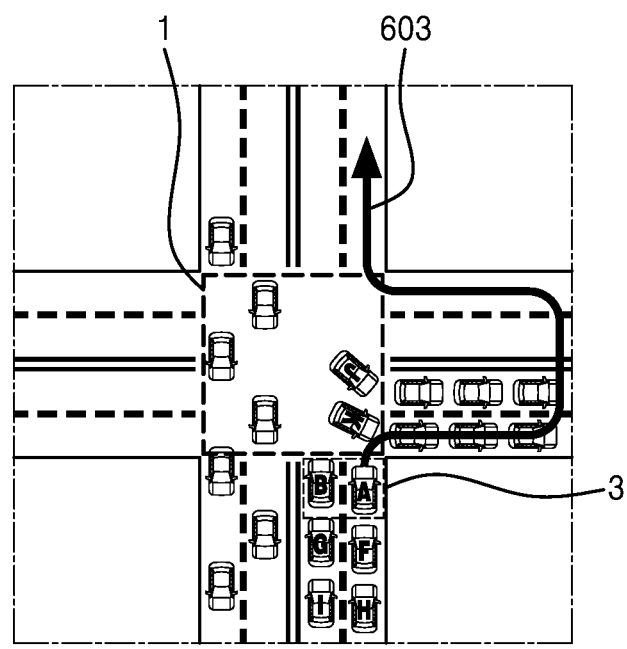

In FIG. 4, the vehicle A may be located in the second area 3 spaced apart from the monitored area 1 (e.g., an intersection) ahead, by a second distance (e.g., a short distance) as illustrated in FIGS. 6A, 6B, and 6C.

In this case, in operation 401, the electronic device 100 may obtain second surrounding area information of the vehicle A located at the second distance. The second surrounding area information may include, for example, traffic signal information or driving information of nearby vehicles.

In operation 402, the electronic device 100 may determine a congestion level of the monitored area 1 by using the second surrounding area information.

In operation 403, the electronic device 100 may determine whether the congestion level of the monitored area 1 is less than a critical value. When the congestion level of the monitored area 1 is less than the critical value, in operation 404, the electronic device 100 may provide, to the driving unit, a first control command for controlling the vehicle A to operate in an autonomous driving mode. When the congestion level of the monitored area 1 is equal to or greater than the critical value, in operation 405, the electronic device 100 may provide, to the driving unit, a second control command for controlling the vehicle A to operate in a driver driving mode in which the vehicle A is driven by a driver.

According to embodiments, the electronic device 100 may determine an operating mode of the vehicle A in consideration of whether nearby vehicles are present at the intersection and whether the nearby vehicles are driving (or a driving speed of the nearby vehicles). For example, when nearby vehicles are present at the intersection but do not exceed a certain speed, the electronic device 100 may determine that the congestion level of the monitored area 1 is very high, control the vehicle to be disengaged from the autonomous driving mode and operate in the driver driving mode. When the congestion level of the monitored area 1 is high but the driver requests to maintain the autonomous driving mode, the electronic device 100 may set a driving route not to enter the intersection but to wait until congestion of the intersection is solved.

Figure 5:
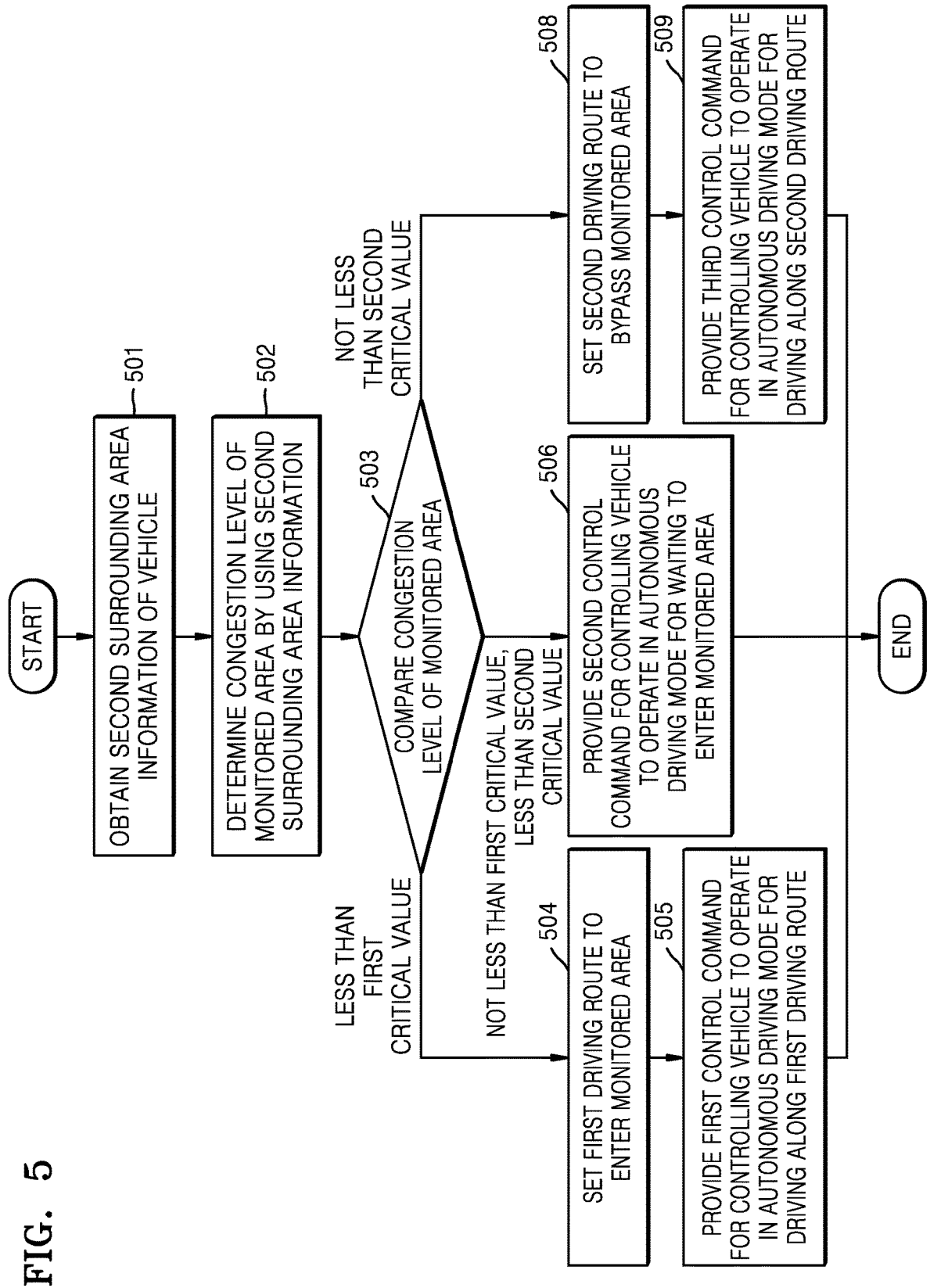
FIG. 5 is a flowchart of a method, performed by an electronic device, of controlling a vehicle, according to an embodiment.

FIG. 5 is a flowchart of a method, performed by the electronic device 100, of controlling the vehicle A, according to an embodiment.

In FIG. 5, the vehicle A may be located in the second area 3 spaced apart from the monitored area 1 (e.g., an intersection) ahead, by a second distance (e.g., a short distance) as illustrated in FIGS. 6A, 6B, and 6C.

In this case, in operation 501, the electronic device 100 may obtain second surrounding area information of the vehicle A located at the second distance. The second surrounding area information may include, for example, traffic signal information or driving information of nearby vehicles.

In operation 502, the electronic device 100 may determine a congestion level of the monitored area 1 by using the second surrounding area information.

In operation 503, the electronic device 100 may compare the congestion level of the monitored area 1 to a first critical value and a second critical value.

When the congestion level of the monitored area 1 is less than the first critical value, in operation 504, the electronic device 100 may set a first driving route to enter the monitored area 1. For example, the electronic device 100 may set a first driving route 601 as illustrated in FIG. 6A. In operation 505, the electronic device 100 may provide, to the driving unit of the vehicle A, a first control command for controlling the vehicle A to operate in an autonomous driving mode for driving along the set first driving route 601.

When the congestion level of the monitored area 1 is equal to or greater than the first critical value and is less than the second critical value, in operation 506, the electronic device 100 may provide, to the driving unit of the vehicle A, a second control command for controlling the vehicle A to operate in an autonomous driving mode for waiting to enter the monitored area 1. For example, the electronic device 100 may determine that the vehicle A cannot easily enter the intersection, and control the vehicle A to wait (see reference numeral 602) behind a stop line of the intersection as illustrated in FIG. 6B.

When the congestion level of the monitored area 1 is equal to or greater than the second critical value, in operation 508, the electronic device 100 may set a second driving route for bypassing the monitored area 1, as an alternative route. For example, the electronic device 100 may set a second driving route 603 as illustrated in FIG. 6C. In operation 509, the electronic device 100 may provide, to the driving unit of the vehicle A, a third control command for controlling the vehicle A to operate in an autonomous driving mode for driving along the set second driving route 603.

As another example, when the congestion level of the monitored area 1 is equal to or greater than the second critical value, the electronic device 100 may determine that the vehicle A cannot easily drive through the congested intersection in an autonomous driving mode, and activate a user interface (UI) for asking a driver whether to operate in a driver driving mode. The activating of the UI may include displaying a graphic user interface (GUI) on a display of the vehicle A, flashing a driver driving mode or autonomous driving mode on/off button, or outputting sound for asking whether to turn on a driver driving mode and/or to turn off an autonomous driving mode.

The electronic device 100 may determine the congestion level of the monitored area 1 (e.g., an intersection) by using the second surrounding area information in various manners.

According to an embodiment, the second surrounding area information may include driving information of nearby vehicles located at the intersection. The driving information may include, for example, a driving direction (e.g., a forward direction, a right direction, or a diagonal direction) and a driving speed of the nearby vehicles. The second surrounding area information may include traffic signal information near the vehicle A and the nearby vehicles at the intersection. The traffic signal information may include, for example, a lighting cycle of a traffic light located at the intersection in a driving direction of the vehicle A, or a status of the traffic light.

According to embodiments, the electronic device 100 may set a driving route based on a status of a surrounding area of the vehicle A. The status of the surrounding area of the vehicle A may include the congestion level of the intersection, which is determined using the second surrounding area information, tailgating probabilities of the nearby vehicles, which are determined based on the second surrounding area information, or information indicating whether the vehicle A may legally drive through the intersection (e.g., continuously drive, wait for a signal, or change lanes). The status of the surrounding area of the vehicle A may include information indicating whether nearby vehicles are tailgating at the intersection before the vehicle A crosses a stop line of the intersection. When tailgating is predicted, the driving route may be conservatively set. For example, the driving route of the vehicle A may be set to wait for a signal behind the stop line of the intersection. To set the driving route of the vehicle A to wait for a signal behind the stop line, the electronic device 100 may set the driving route by rapidly and effectively determining the status of the surrounding area immediately before the intersection.

Figure 9A:
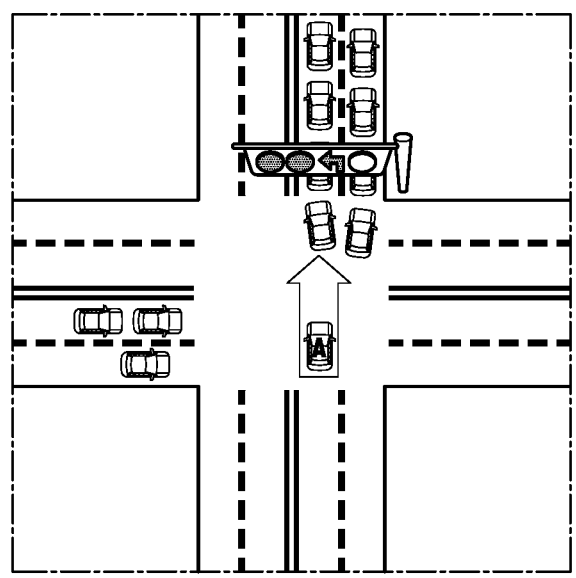
FIGS. 9A, 9B, and 9C illustrate a vehicle driving through a monitored area along a driving route, according to an embodiment.
Figure 9B:
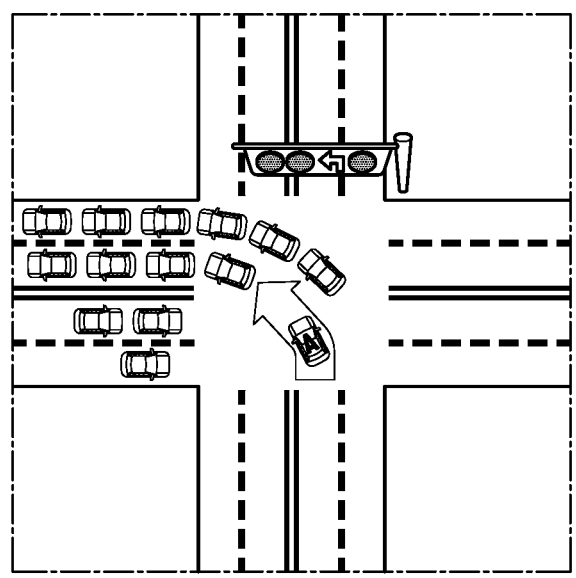
Figure 9B:
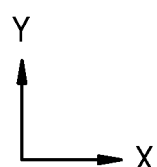
Figure 9C:
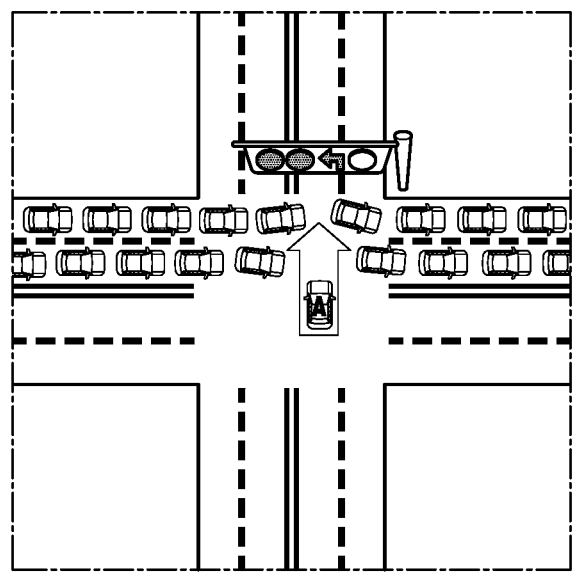
Figure 9C:
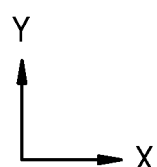

According to embodiments, the second surrounding area information may include at least one of information indicating whether nearby vehicles are present at the intersection, driving information of the nearby vehicles (e.g., a driving speed and a driving direction of the nearby vehicles), or a status of a traffic light located at the intersection in a driving direction of the vehicle A. The status of the traffic light may include, for example, a remaining time of a green light or a remaining time of a red light. The second surrounding area information may include a predicted occupancy time during which the nearby vehicles located at the intersection are predicted to occupy the driving route of the vehicle A. The predicted occupancy time may be calculated based on the set driving route of the vehicle A when the driving direction of the nearby vehicles is different from the driving direction of the vehicle A as illustrated in FIG. 9C. Alternatively, the predicted occupancy time may be calculated in consideration of a speed of the nearby vehicles and a speed of the vehicle A together when the driving direction of the nearby vehicles is the same as the driving direction of the vehicle A as illustrated in FIGS. 9A and 9B. For example, when the driving speed of the nearby vehicles is the same as the driving speed of the vehicle A, the predicted occupancy time during which the nearby vehicles are predicted to occupy the driving route of the vehicle A may be '0'.

In this case, upon determining that nearby vehicles are present at the intersection, the electronic device 100 may perform a tailgating handling mode.

For example, the status of the traffic light indicates a green light, the electronic device 100 may calculate the predicted occupancy time of the nearby vehicles by using the driving information of the nearby vehicles. Upon determining that 'the remaining time of the green light>the predicted occupancy time', the electronic device 100 may predict that congestion due to tailgating will be solved, and determine that the congestion level of the intersection to be medium (e.g., a value of 1). Alternatively, upon determining that 'the remaining time of the green light<the predicted occupancy time', the electronic device 100 may predict that congestion due to tailgating will be continued, and determine that the congestion level of the intersection to be high (e.g., a value of 2). When the electronic device 100 cannot easily determine the remaining time of the green light, the electronic device 100 may determine the congestion level of the intersection based on a density of the nearby vehicles located at the intersection or the driving information of the nearby vehicles.

As another example, when the status of the traffic light indicates a red light, the electronic device 100 may calculate the predicted occupancy time of the nearby vehicles by using the driving information of the nearby vehicles. Upon determining that 'the remaining time of the red light>the predicted occupancy time', the electronic device 100 may predict that congestion due to tailgating will not occur, and determine the congestion level of the intersection to be low (e.g., a value of 0). Alternatively, upon determining that 'the remaining time of the red light<the predicted occupancy time', the electronic device 100 may predict that congestion due to tailgating will be continued, and determine that the congestion level of the intersection to be high (e.g., a value of 2). When the electronic device 100 cannot easily determine the remaining time of the red light, the electronic device 100 may monitor the information indicating whether nearby vehicles are present at the intersection and the driving information of the nearby vehicles, and set a driving route of the vehicle A to wait until the status of the traffic light changes to a green light. When the status of the traffic light cannot be identified, the electronic device 100 may not enter the intersection.

For example, the vehicles following the nearby vehicles may also tailgate, and the electronic device 100 may monitor an overall status of the intersection. For example, the electronic device 100 may monitor the status of the intersection in consideration of not only the driving route of the vehicle A but also every direction of the intersection.

In the afore-described embodiment of the disclosure, the remaining time of the green light or the remaining time of the red light cannot be directly identified. In this case, the electronic device 100 may predict the remaining time of the green light or the remaining time of the red light by collecting information indicating the status of the traffic light in the driving direction of the vehicle A at the intersection but also information indicating the status of the traffic light in a driving direction of other vehicles at the intersection.

According to embodiments, the second surrounding area information may include at least one of information indicating whether nearby vehicles are present at the intersection, a driving speed of the nearby vehicles, a required driving distance of the nearby vehicles, which is required to allow the vehicle A to pass through the intersection, a predicted required time for light on, which is to be taken until a traffic light in the driving direction of the vehicle A changes to a green light, a light-on duration during which the green light is maintained after being turned on, a predicted driving distance before light on, by which the nearby vehicles are predicted to drive before the green light is turned on, or a predicted driving distance before light off, by which the nearby vehicles are predicted to drive before the green light is turned off. At this time, the predicted driving distance before light on may be calculated as '(b) the driving speed of the nearby vehicles×the required driving distance of the nearby vehicles'. In addition, the predicted driving distance before light off may be calculated as '(the driving speed of the nearby vehicles×the required driving distance of the nearby vehicles)+(the driving speed of the nearby vehicles×the light-on duration)'.

In this case, upon determining that nearby vehicles are present at the intersection, the electronic device 100 may perform a tailgating handling mode.

For example, when 'the predicted driving distance before light on>the required driving distance of the nearby vehicles', the electronic device 100 may predict that congestion due to tailgating will be solved. When 'the predicted driving distance before light on<the required driving distance of the nearby vehicles', the electronic device 100 may determine that congestion due to tailgating will be continued after the green light is turned on. When 'the required driving distance of the nearby vehicles<the predicted driving distance of the nearby vehicles before light off', the electronic device 100 may determine that the vehicle A may drive through the intersection. When 'the required driving distance of the nearby vehicles>the predicted driving distance of the nearby vehicles before light off', the electronic device 100 may determine that the vehicle A cannot easily drive through the intersection even after the green light is turned on. In this case, because the vehicle A cannot easily drive through the intersection even after the green light is turned on again later, the electronic device 100 may set a driving route to avoid the tailgating situation.

For example, when the predicted required time for the light on and the light-on duration cannot be identified and the driving speed of the nearby vehicles is equal to or less than a critical value (e.g., equal to or less than 5 km/h), the electronic device 100 may perform a tailgating handling mode.

Figure 7:
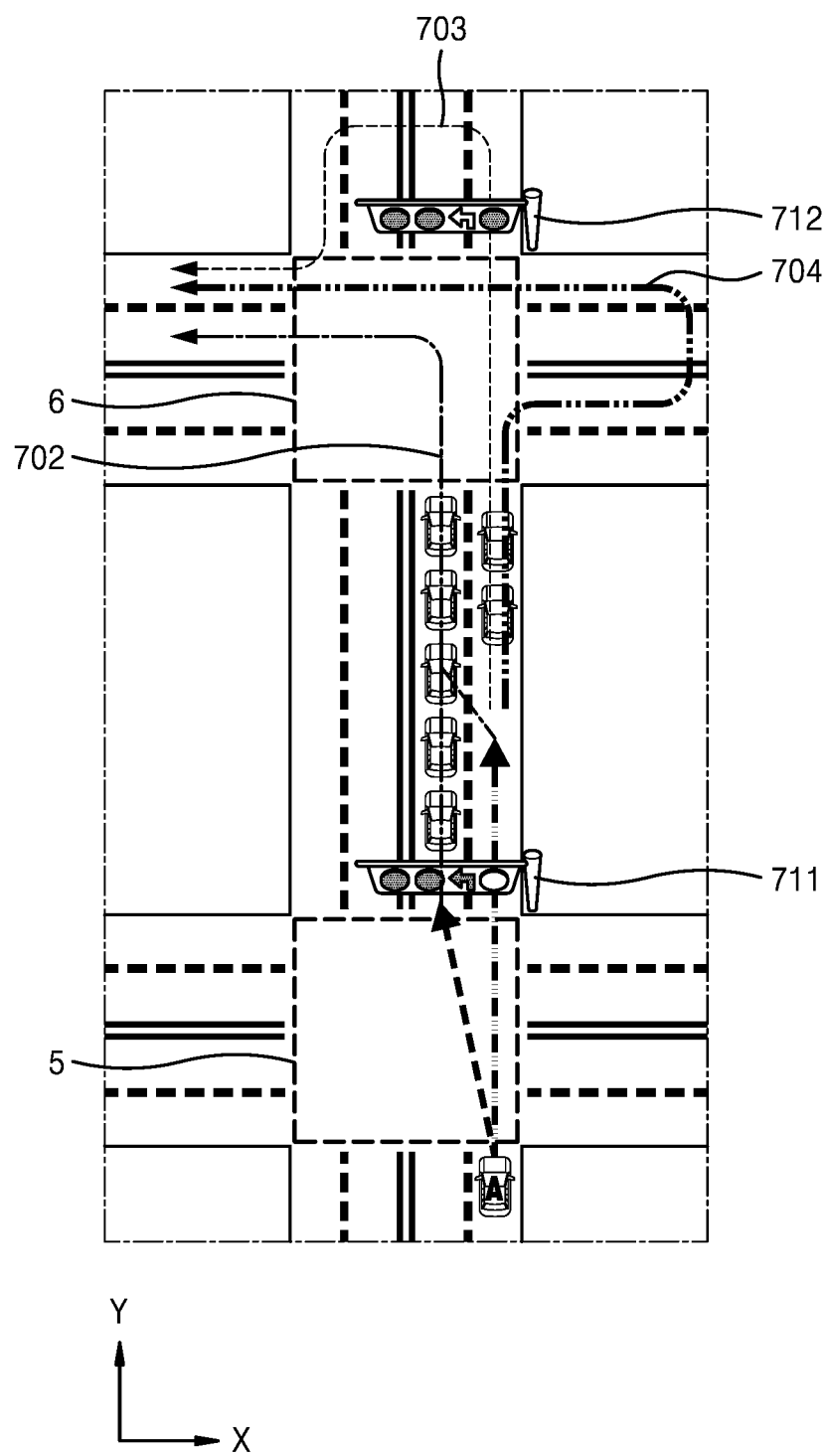
FIG. 7 is an image illustrating a vehicle driving through a monitored area along a driving route, according to an embodiment.

FIG. 7 is an image illustrating the vehicle A driving through a monitored area along a driving route, according to an embodiment.

In FIG. 7, the electronic device 100 may set a driving route for entering and driving through an intersection, or an alternative driving route in consideration of a congestion level of the intersection.

The electronic device 100 may obtain surrounding area information of the vehicle A, e.g., a status of a traffic light 711 and/or a status of a traffic light 712, and determine a congestion level of the set driving route by using the obtained surrounding area information. For example, when a status of a traffic light 711 located in a driving direction of the vehicle A indicates a proceed signal (e.g., a green light), the electronic device 100 may determine congestion levels of first and second intersections 5 and 6 located in a forward direction corresponding to the driving direction of the vehicle A, by using the obtained surrounding area information. The surrounding area information at this time may include, for example, a speed of a nearby vehicle in front, which is obtained by a radar sensor, or locations of nearby vehicles of the vehicle A/sidewalks/waterways, which are obtained by a camera or a lidar sensor.

Upon determining that the congestion level of the intersection is high, the electronic device 100 may set an alternative driving route (e.g., a driving route for bypassing the intersection).

Specifically, in FIG. 7, the vehicle A may have an original driving route 702 for changing to lane 1 through the first intersection 5 and making a left turn at the second intersection 6, or for driving in the nearside lane (e.g., lane 2) through the first intersection 5 and making a left turn at the second intersection 6. In this case, lane 1 may be congested and thus the vehicle A cannot easily make a left turn at the second intersection 6. For example, when the vehicle A changes to lane 1, the vehicle A cannot pass through the first intersection 5 and thus disturb following vehicles or vehicles driving in an X direction at the first intersection 5.

When the congestion level of the intersection is high as described above, the electronic device 100 may set an alternative driving route 703 or 704. For example, the electronic device 100 may set the alternative driving route 703 for driving in the nearside lane (e.g., lane 2) straight through the second intersection 6, making a U-turn, and then making a right turn to return to the original driving route 702. Alternatively, the electronic device 100 may set the alternative driving route 704 for making a right turn at the second intersection 6, making a U-turn, and then passing straight through the second intersection 6 to return to the original driving route 702.

The electronic device 100 may provide, to a driver or a passenger, notification information indicating a current status of the intersection or indicating that the driving route has changed. For example, the electronic device 100 may provide the notification information through a display of the vehicle A, or through a microphone as a voice.

Figure 8:
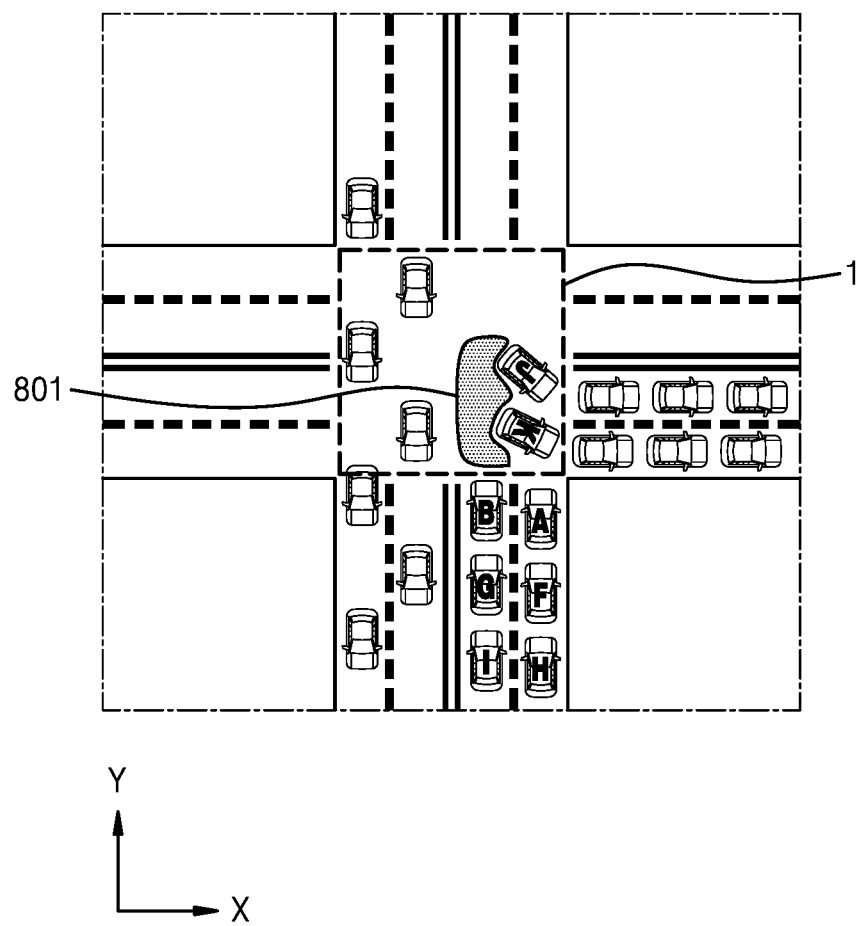
FIG. 8 is an image illustrating a vehicle driving through a monitored area along a driving route, according to an embodiment.

FIG. 8 is an image illustrating the vehicle A driving through a monitored area along a driving route, according to an embodiment.

In FIG. 8, the vehicle A may be scheduled to drive straight through the monitored area 1 (e.g., the intersection). In this case, the electronic device 100 may identify nearby vehicles driving in an X direction at the monitored area 1, and obtain driving information of the nearby vehicles (e.g., a driving speed). For example, when a status of a traffic light located at the monitored area 1 in a driving direction of the vehicle A indicates a proceed signal (e.g., a green light), the electronic device 100 may determine whether the vehicles driving in the X direction block the driving route of the vehicle A. Upon determining that the nearby vehicles block the driving route of the vehicle A, the electronic device 100 may determine a tailgating situation in which a congestion level of the monitored area 1 is high, operate in a safe driving mode (e.g., a mode for keeping in a lane and keeping a safe distance from a vehicle in front to prevent an accident), and calculate a proceedable time to pass through the monitored area 1.

When the proceedable time is equal to or greater than a critical value, the electronic device 100 may determine that the congestion level of the monitored area 1 is high, and perform an active entry mode (e.g., a tailgating handling mode). Alternatively, the electronic device 100 may perform a mode for changing to an adjacent lane, or operate the vehicle A to perform one of driver driving modes. Before the active entry mode is performed, the electronic device 100 may provide, to the driver or the passenger, a UI for receiving a confirmation to perform the active entry mode. Alternatively, the electronic device 100 may provide a UI for receiving a confirmation to switch to a driver driving mode for being manually driven by the driver.

When the active entry mode is performed, the electronic device 100 may obtain driving information of nearby vehicles located at or near the monitored area 1. For example, the electronic device 100 may obtain a driving route of nearby vehicles driving in a direction opposite to the driving direction of the vehicle A. Alternatively, the electronic device 100 may obtain driving information of an adjacent vehicle B and attribute information of the adjacent vehicle B (e.g., a size or a model). The electronic device 100 may measure the size of an empty space 801 between tailgating nearby vehicles J and K and the nearby vehicles driving in the opposite direction.

At this time, upon determining that the measured size of the empty space 801 is sufficient for the vehicle A and the adjacent vehicle B to drive through the empty space 801, the electronic device 100 may slowly drive ahead by avoiding the nearby vehicles J and K. When the adjacent vehicle B occupies a large space to drive and a driving space for the vehicle A is not ensured, the electronic device 100 may determine that the size of the empty space 801 is insufficient for the vehicle A and the adjacent vehicle B to drive together. When the size of the empty space 801 is insufficient, the electronic device 100 may continuously monitor to determine which of the vehicle A and the adjacent vehicle B may preferentially enter the empty space 801. When the adjacent vehicle B may preferentially enter the empty space 801, the electronic device 100 may control the vehicle A to temporarily stop while attempting to enter the empty space 801 as long as possible. As the adjacent vehicle B gradually drives ahead, the electronic device 100 may control the vehicle A to follow the adjacent vehicle B and drive ahead of another adjacent vehicle G. At this time, when the other adjacent vehicle G suddenly enters the empty space 801 and thus the empty space 801 is insufficient for the vehicle A, the electronic device 100 may monitor again to determine which of the vehicle A and the other adjacent vehicle G may preferentially enter the empty space 801.

In this case, the electronic device 100 may control the vehicle A to provide, to the other adjacent vehicle G, a signal for requesting to give way to the vehicle A. For example, the electronic device 100 may control the vehicle A to flash emergency lights. Alternatively, when a separate notification light is located at a certain location of the vehicle A (e.g., a side of the vehicle A), the electronic device 100 may control the vehicle A to flash the notification light. As another example, the electronic device 100 may control the vehicle A to request the tailgating nearby vehicles J and K to drive fast. For example, the electronic device 100 may control the vehicle A to flash headlights or sound a horn. Alternatively, the electronic device 100 may control the vehicle A to output a voice for requesting to drive fast (e.g., 'Please drive faster').

According to embodiments, when the vehicle A enters the monitored area 1, the electronic device 100 may predict an intersection passage time of the vehicle A to determine whether the vehicle A may pass through the monitored area 1. Based on the predicted intersection passage time of the vehicle A, the electronic device 100 determines a tie-up level of the vehicle A (e.g., the congestion level of the monitored area 1), and notify the tie-up level of the vehicle A to the driver. The electronic device 100 may provide, to the driver, a UI for asking whether to pass through a seriously congested intersection, a UI for asking whether to change the driving route of the vehicle A, a UI for notifying that the driving route of the vehicle A is changed, or a UI for notifying a predicted time to be taken when the vehicle A passes through the monitored area 1.

FIGS. 9A, 9B, and 9C illustrate the vehicle A driving through a monitored area along a driving route, according to embodiments.

FIG. 9A may correspond to a case in which the vehicle A recognizes a proceed signal at an intersection but the intersection is congested due to nearby vehicles driving ahead. FIG. 9B may correspond to a case in which the vehicle A recognizes a left-turn signal at an intersection but the intersection is congested due to nearby vehicles making left turns. FIG. 9C may correspond to a case in which the vehicle A recognizes a proceed signal and has entered an intersection but the vehicle A is tied up at the intersection due to nearby vehicles driving ahead in an X direction.

The electronic device 100 may set a driving route by collecting driving information of the nearby vehicles as much as possible. For example, in FIGS. 9A and 9B, a congested lane may be the same as the driving route of the vehicle A. In this case, the electronic device 100 may obtain, as surrounding area information, driving information of vehicles located on the driving route of the vehicle A. For example, when the vehicle A is scheduled to drive ahead as illustrated in FIG. 9A, the electronic device 100 may obtain driving information of vehicles driving ahead. As another example, when the vehicle A is scheduled to make a left turn as illustrated in FIG. 9B, the electronic device 100 may obtain driving information of vehicles making left turns. As another example, in FIG. 9C, a congested lane may be different from the driving route of the vehicle A. In this case, the electronic device 100 may obtain driving information of vehicles located on a driving route different from the driving route of the vehicle A (e.g., an X-direction route).

In each of FIGS. 9A, 9B, and 9C, the electronic device 100 may determine a congestion level of the intersection based on at least one of the driving information of the nearby vehicles (e.g., a speed of the nearby vehicles), a current location of the vehicle A, or a remaining time of a signal of a traffic light located in a driving direction of the vehicle A.

In FIGS. 9A and 9B, upon determining that the congestion level of the intersection is less than a critical value, the electronic device 100 may set a driving route of the vehicle A to drive through the intersection. Otherwise, upon determining that the congestion level of the intersection is equal to or greater than the critical value, the electronic device 100 may set a driving route of the vehicle A to wait behind a stop line of the intersection. Alternatively, the electronic device 100 may provide a control command for forwarding control to a driver and operating the vehicle A in a driver driving mode. As another example, in FIG. 9C, because the nearby vehicles driving in the X direction crossing the driving direction of the vehicle A are tied up, although the traffic light is green to indicate a proceed signal, the electronic device 100 may set a driving route to wait behind the stop line until a space for allowing the vehicle A to pass through the intersection is ensured. Alternatively, the electronic device 100 may provide a control command for forwarding control to the driver and operating the vehicle A in a driver driving mode.

Figure 10A:
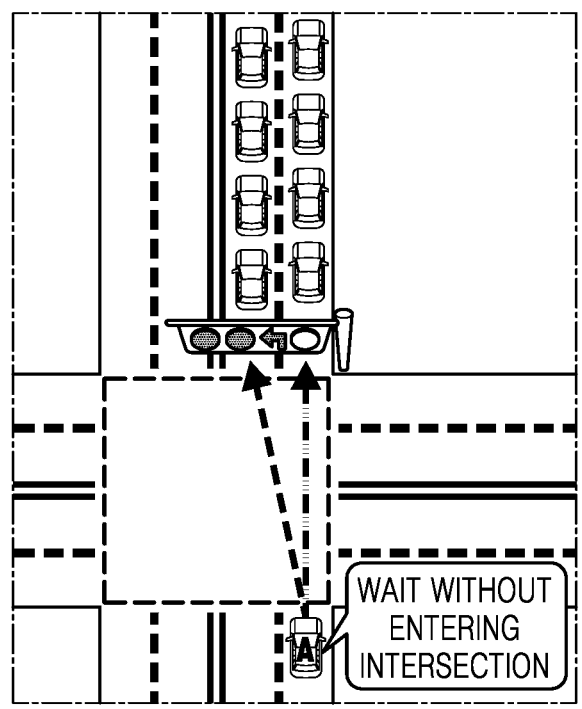
FIGS. 10A, 10B, and 10C illustrate a method of notifying a driving status of a vehicle, according to an embodiment.
Figure 10B:
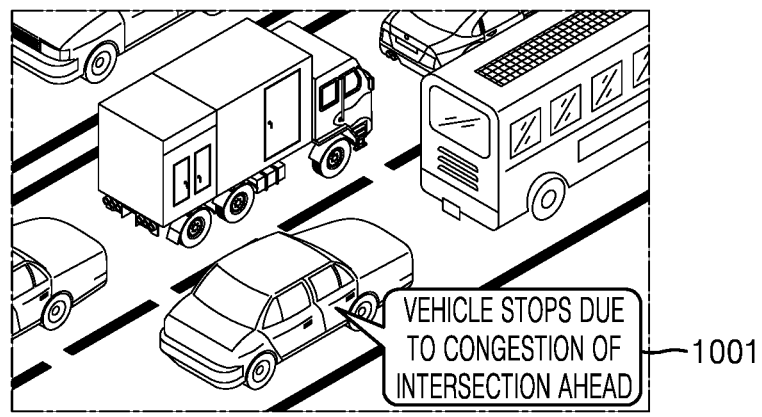
Figure 10C:
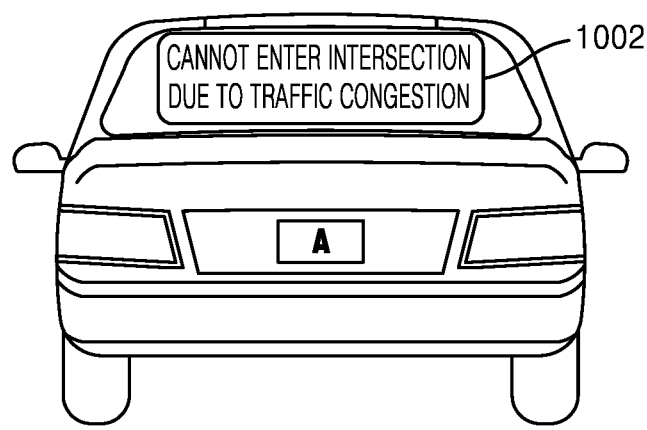

FIGS. 10A, 10B, and 10C illustrate a method of notifying a driving status of the vehicle A, according to embodiments.

In FIGS. 10A, 10B, and 10C, sensors of the vehicle A (e.g., a camera, a lidar sensor, a radar sensor, and an infrared heat detection sensor) may sense surrounding area information of the vehicle A. The electronic device 100 may set a driving route based on the sensed values. For example, the electronic device 100 may recognize a traffic light located at an intersection in a driving direction of the vehicle A, by using the image captured by a camera, measure a driving speed of nearby vehicles (e.g., a vehicle in front) by using a value sensed by the radar sensor, and determine locations and the number of the nearby vehicles by using a value sensed by the camera or the lidar sensor. The electronic device 100 may determine a congestion level of the intersection based on the sensed surrounding area information, and set a driving route of the vehicle A or notify a driving status of the vehicle A or a status of the intersection to the nearby vehicles based on the congestion level of the intersection.

According to an embodiment, as a result of determining the congestion level of the intersection and a status of the traffic light, although the status of the traffic light indicates a proceed signal (e.g., a green light), when congestion of the intersection or disturbance of other vehicles by the vehicle A after entering the intersection is predicted, as illustrated in FIG. 10A, the electronic device 100 may set a driving route of the vehicle A not to enter the intersection. As illustrated in FIG. 10B, the electronic device 100 may notify a status of the intersection or setting information of the driving route to a driver or a passenger of the vehicle A. For example, the electronic device 100 may provide, to the driver or the passenger, a notification 1001 of 'Vehicle stops due to congestion of intersection ahead' through a display or as a voice.

When the vehicle A waits without entering the intersection, for following vehicles which cannot identify the status of the traffic light, as illustrated in FIG. 10C, the electronic device 100 may notify the status of the vehicle A or the status of the intersection through a display of the vehicle A. For example, the electronic device 100 may provide a notification 1002 of 'Cannot enter intersection due to traffic congestion' through the display of the vehicle A.

Figure 11:
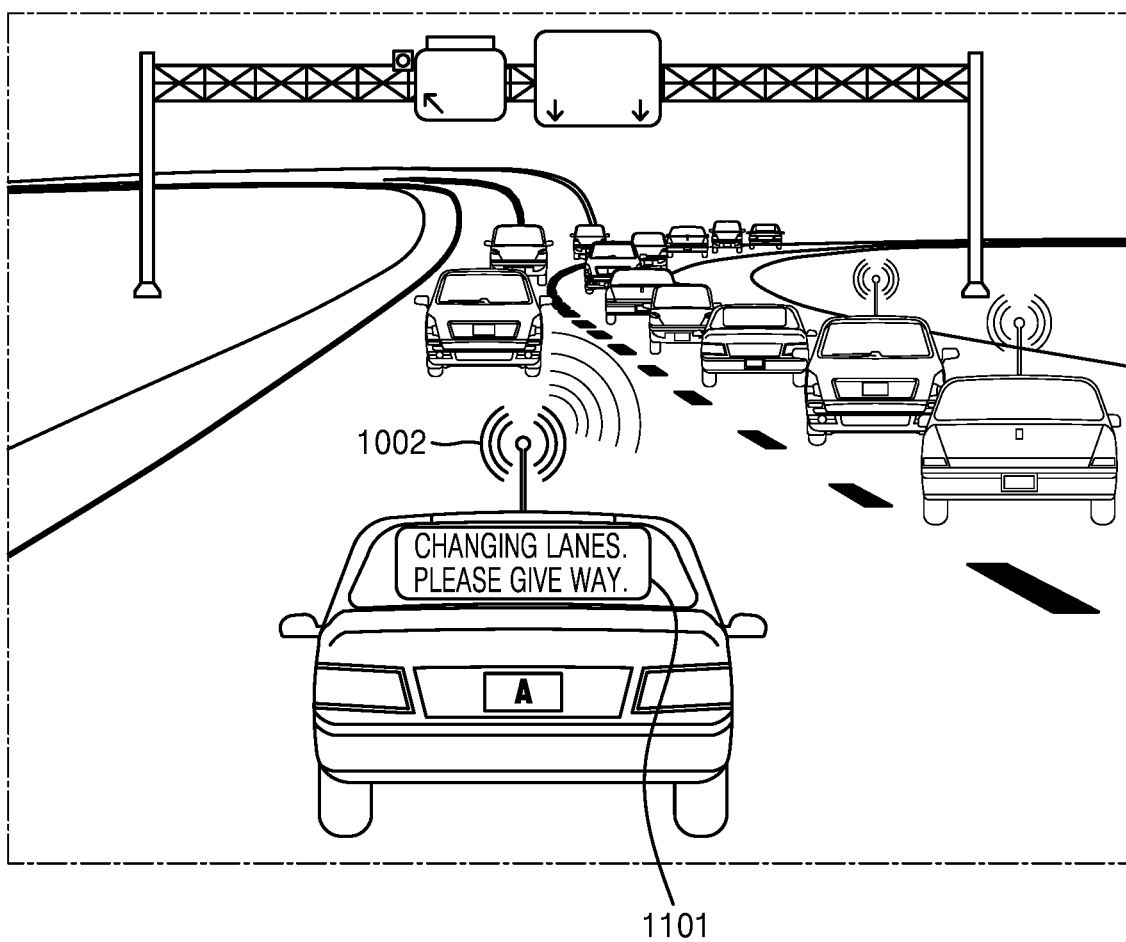
FIG. 11 is an image for describing a method of notifying a driving status of a vehicle, according to an embodiment.

FIG. 11 is an image for describing a method of notifying a driving status of the vehicle A to nearby vehicles, according to an embodiment.

In FIG. 11, the electronic device 100 may determine that a congestion level of an intersection is high, based on surrounding area information. In this case, although the congestion level of the intersection is high, the electronic device 100 might not set an alternative driving route.

As such, as indicated by reference numeral 1101 of FIG. 11, the electronic device 100 may request the nearby vehicles to give way by notifying a driving route to the nearby vehicles through a display of the vehicle A.

Alternatively, as indicated by reference numeral 1102 of FIG. 11, when vehicle-to-vehicle (V2V) communication is enabled between the vehicle A and nearby vehicles, the electronic device 100 may provide the driving route or a signal for requesting to give way, to the nearby vehicles to drive along the driving route (e.g., to change to a lane of the nearby vehicles. Otherwise, the electronic device 100 may obtain, from the nearby vehicles, route information indicating driving routes of the nearby vehicles. That is, by sharing driving routes between the vehicle A and the nearby vehicles, the electronic device 100 may set a driving route to minimize traffic congestion. In this case, the electronic device 100 of the vehicle A and electronic devices of the nearby vehicles may determine priorities therebetween. That is, when the driving route of the vehicle A is the same as the driving routes of the nearby vehicles, the electronic device 100 may determine priorities in consideration of waiting times of the vehicles, an intersection entry time, emergency levels of the vehicles, or the like, and set a driving route based on the priorities. As such, traffic of the road on which the vehicle A drives may be improved overall.

According to embodiments, at a smart intersection, the vehicle A may communicate with a traffic light of the intersection. In this case, the electronic device 100 may preliminarily obtain driving information of the nearby vehicles (e.g., a driving speed), the congestion level of the intersection, and a status of the traffic light (e.g., a lighting cycle, a signal direction, or a remaining cycle) and determine whether to enter the intersection or set an alternative driving route of the vehicle A.

Figure 12A:
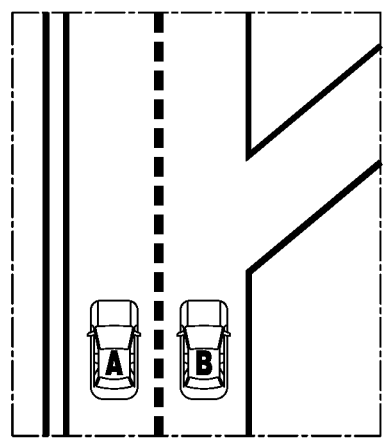
FIGS. 12A and 12B illustrate communication between vehicles, according to an embodiment.
Figure 12B:
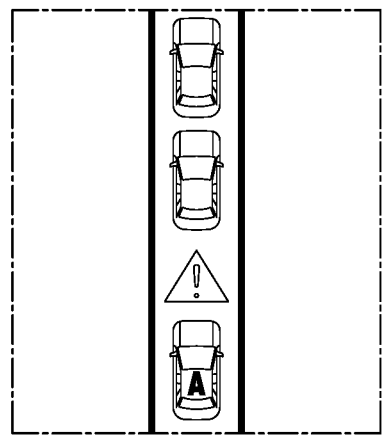

FIGS. 12A and 12B illustrate communication between the vehicle A and a nearby vehicle B, according to an embodiment.

V2V communication may refer to exchange of driving intentions between a driver of a vehicle and a driver of a nearby vehicle. For example, means for V2V communication may include emergency lights, high beams, hand signals, left signal lights, and right signal lights.

As autonomous vehicles are increasingly popularized, communication between an autonomous vehicle and a manual vehicle (or a legacy vehicle) driven by a driver, and communication between an autonomous vehicle and an autonomous vehicle may be necessitated. For example, although a driver may slow down to give way to an autonomous vehicle which is scheduled to change lanes, the autonomous vehicle might not recognize such an intention of the driver. Because V2V communication is performed in a unidirectional manner, agreements between two vehicles for communication might not be ensured.

As such, to solve the problems of V2V communication, improvement of communication means and methods may be needed and new-type flashers using light-emitting diode (LED) technology may be used. For example, to indicate a signal for allowing a nearby vehicle to pass or a signal for giving way to a nearby vehicle, green flashers may be provided on a vehicle. Alternatively, in consideration of protanopes and deuteranopes, blue flashers may be provided on an autonomous vehicle. In addition, a lighting cycle of emergency lights may be adjusted based on an emergency level of the vehicle. For example, the lighting cycle of the emergency lights or other flashers may be adjusted in consideration of a status of the vehicle, e.g., lane changing, an accident, or a sudden stop.

The electronic device 100 may recognize the above-described new-type flashers and the lighting cycle, and set a driving route to control the vehicle based on the recognition result. Particularly, in a case of an accident or a sudden stop, the electronic device 100 may notify following vehicles by using a broadcast signal. When the new-type flashers and the lighting cycle are learned, a driver of a manual vehicle may also participate in communication between the autonomous vehicle and the manual vehicle.

According to an embodiment, in FIGS. 12A and 12B, the vehicle A should exit to a right lane but cannot easily change lanes. In this case, although the vehicle A flashes right signal lights, the nearby vehicle B may probably not give way. Even when the nearby vehicle B stops or slows down, the vehicle A cannot easily recognize that the nearby vehicle B is giving way. This case may occur when the vehicle A is an autonomous vehicle and the nearby vehicle B is a manual vehicle. As such, the electronic device 100 may control the vehicle A to flash the right signal lights in a short cycle. The nearby vehicle B may recognize the right signal lights of the vehicle A as an emergency, and determine to give way. The nearby vehicle B may flash left signal lights in green to show an intention of giving way. The vehicle A may check the intention of the nearby vehicle B, and safely exit to the right lane.

According to an embodiment, as illustrated in FIG. 12B, the vehicle A may suddenly face a congested period. In this case, the electronic device 100 may control the vehicle A to flash emergency lights in a short cycle. Particularly, in consideration of an emergency level and a weather condition, the electronic device 100 may control the vehicle A to change, for example, a lighting cycle and a brightness of the emergency lights.

In this case, an autonomous vehicle or a manual vehicle having installed therein a receiver for enabling communication with an autonomous vehicle may recognize an emergency and transmit, to following vehicles, a broadcast signal indicating the emergency.

Figure 13:
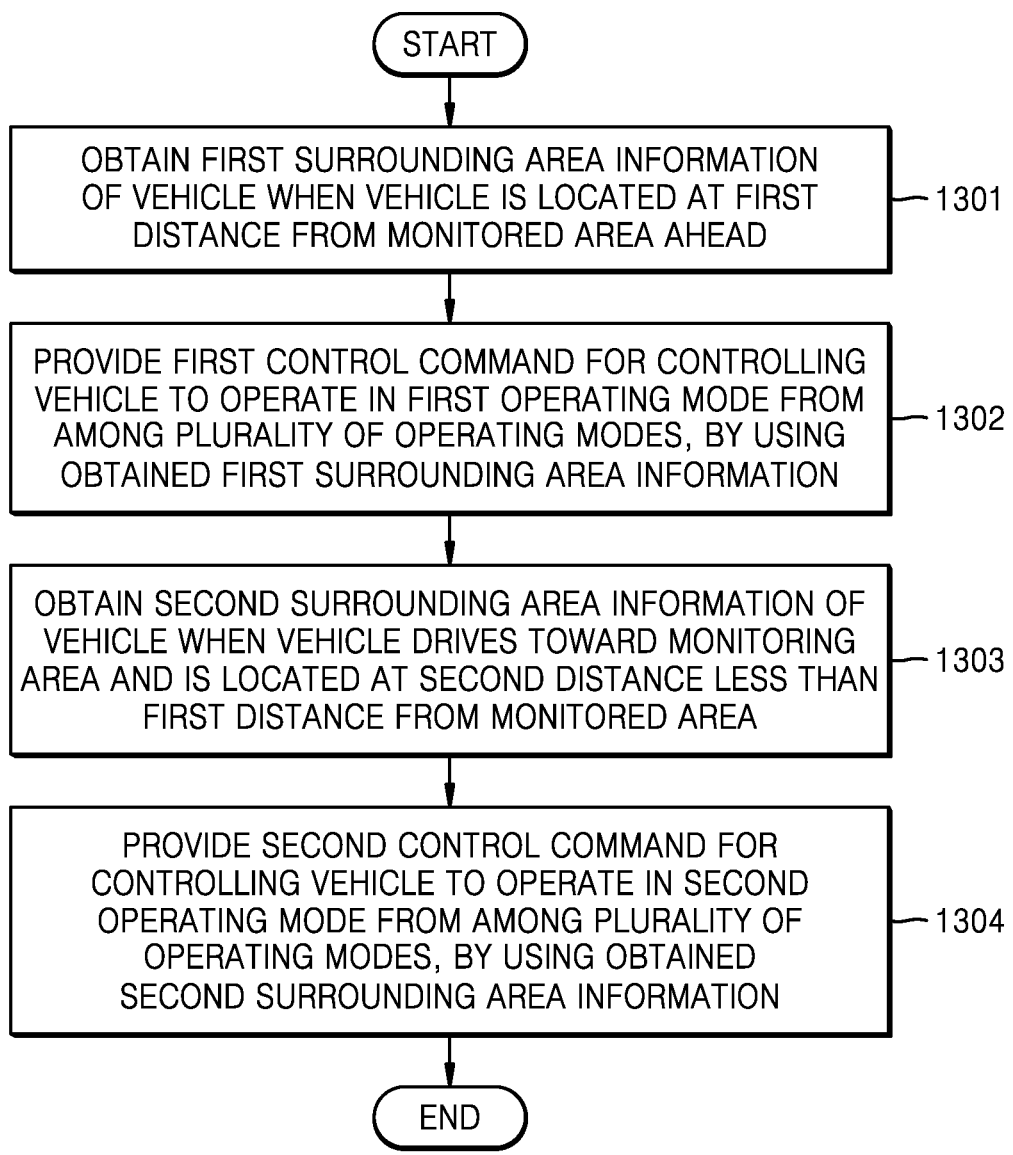
FIG. 13 is a flowchart of a method, performed by an electronic device, of controlling a vehicle, according to an embodiment.

FIG. 13 is a flowchart of a method, performed by the electronic device 100, of controlling the vehicle A, according to an embodiment.

Initially, when the vehicle A is located at a first distance from a monitored area ahead, the electronic device 100 may obtain first surrounding area information of the vehicle A (operation 1301).

The electronic device 100 may provide a first control command for controlling the vehicle A to operate in a first operating mode among a plurality of operating modes, by using the obtained first surrounding area information (operation 1302).

For example, the electronic device 100 may provide the first control command for controlling the vehicle A to operate in an autonomous driving mode for driving along a first driving route set to enter the monitored area, or provide the first control command for controlling the vehicle A to operate in an autonomous driving mode for driving along a second driving route set to bypass the monitored area.

As another example, the electronic device 100 may provide the first control command for controlling the vehicle A to operate in the first operating mode among the plurality of operating modes, by using the first surrounding area information and location information of the vehicle A.

As another example, the electronic device 100 may provide the first control command for controlling the vehicle A to operate in the first operating mode among the plurality of operating modes, by using the first surrounding area information and a driving history of the vehicle A.

Then, in FIG. 13, when the vehicle A drives toward the monitored area and is located at a second distance less than the first distance from the monitored area, the electronic device 100 may obtain second surrounding area information of the vehicle A (operation 1303).

The electronic device 100 may provide a second control command for controlling the vehicle A to operate in a second operating mode among the plurality of operating modes, by using the obtained second surrounding area information (operation 1304).

For example, the electronic device 100 may provide the second control command for controlling the vehicle A to continuously operate in an autonomous driving mode, or provide the second control command for controlling the vehicle A to operate in a driver driving mode in which the vehicle A is driven by a driver.

As another example, the electronic device 100 may provide the second control command for controlling the vehicle A to operate in an autonomous driving mode for driving along a first driving route set to enter the monitored area, provide the second control command for controlling the vehicle A to operate in an autonomous driving mode for waiting to enter the monitored area, or provide the second control command for controlling the vehicle A to operate in an autonomous driving mode for driving along a second driving route set to bypass the monitored area.

According to embodiments, the electronic device 100 may divide at least a part of a distance from the monitored area to the vehicle A into a plurality of areas based on a sensing range of the vehicle A. In this case, when the first distance at which the vehicle A is located from the monitored area is in a first area among the plurality of areas, the electronic device 100 may obtain the first surrounding area information of the vehicle A. When the second distance at which the vehicle A is located from the monitored area is in a second area among the plurality of areas, the electronic device 100 may obtain the second surrounding area information of the vehicle A.

Figure 14:
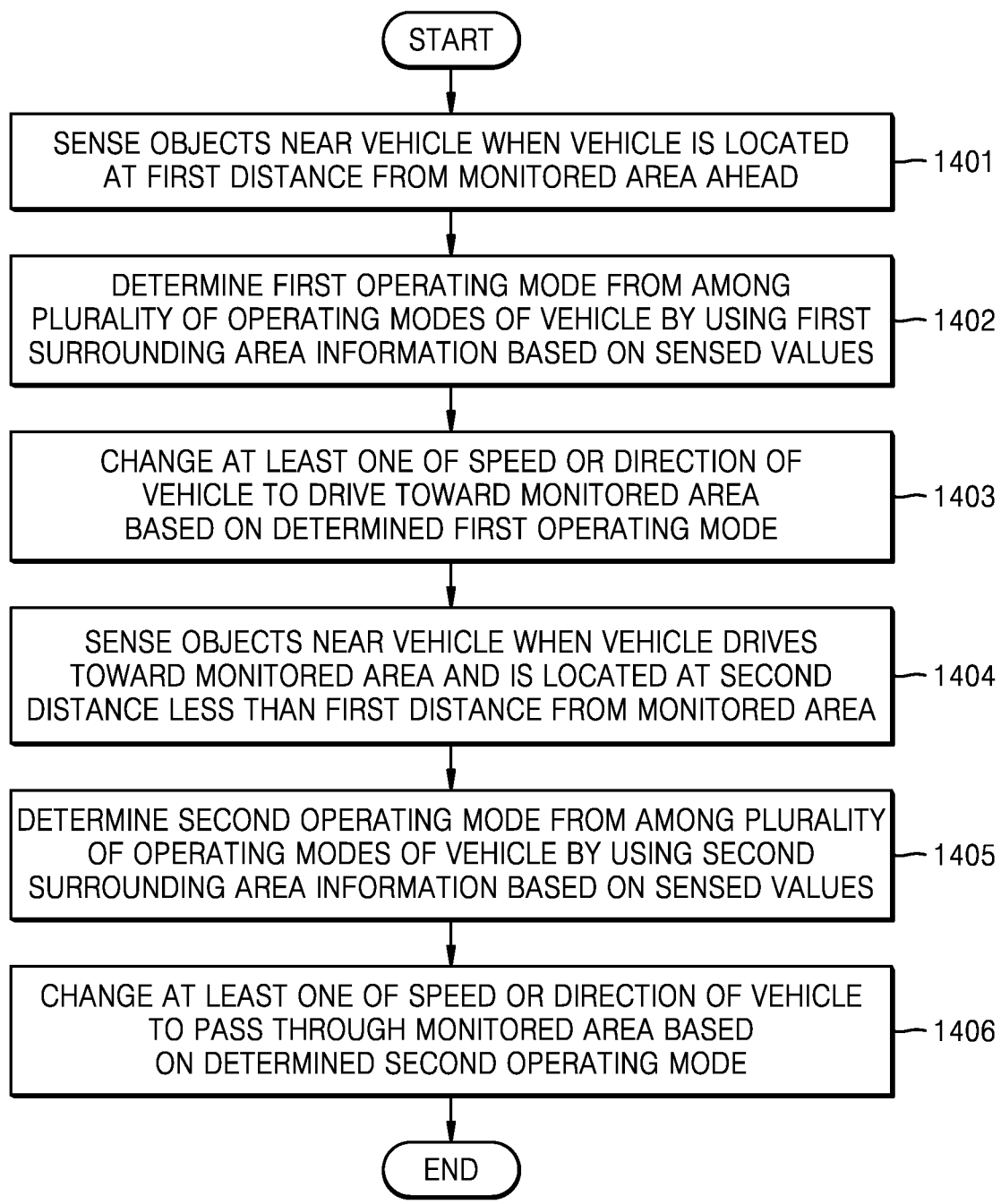
FIG. 14 is a flowchart of an operating method of a vehicle, according to an embodiment.

FIG. 14 is a flowchart of an operating method of the vehicle A, according to an embodiment.

In FIG. 14, when the vehicle A is located at a first distance from a monitored area ahead, the vehicle A may sense objects near the vehicle A, e.g., obtain first sensing information (operation 1401).

The vehicle A may determine a first operating mode among a plurality of operating modes of the vehicle A by using first surrounding area information based on the sensed values of the first sensing information (operation 1402).

The vehicle A may change at least one of a speed or a direction of the vehicle A to drive toward the monitored area based on the determined first operating mode (operation 1403).

When the vehicle A drives toward the monitored area and is located at a second distance less than the first distance from the monitored area, the vehicle A may sense objects near the vehicle A, e.g., obtain second sensing information (operation 1404).

The vehicle A may determine a second operating mode among the plurality of operating modes of the vehicle A by using second surrounding area information based on the sensed values of the second sensing information (operation 1405).

The vehicle A may change at least one of the speed or the direction of the vehicle A to pass through the monitored area based on the determined second operating mode (operation 1406).

Figure 15:
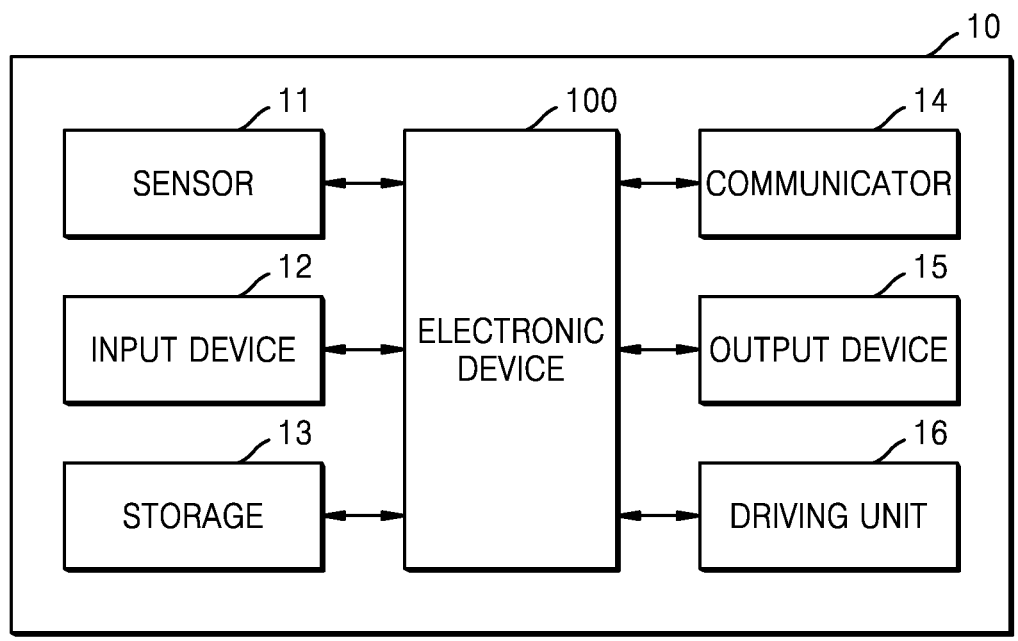
FIG. 15 is a block diagram of a vehicle according to an embodiment.

FIG. 15 is a block diagram of the vehicle A according to an embodiment.

Referring to FIG. 15, the vehicle A may include a sensor 11, an input device 12, a storage 13, a communicator 14, an output device 15, a driving unit 16, and the electronic device 100 which may constitute a driving route setting system 10 of the vehicle A.

The electronic device 100 may include at least one processor. The processor may include an AI processor and, in this case, the processor may set a driving route of the vehicle A by using a trained network model of an AI system. The AI processor may be produced as a dedicated hardware chip for AI, or as a part of a general-use processor (e.g., a central processing unit (CPU) or an application processor) or a graphic processor (e.g., a graphic processing unit (GPU)). The electronic device 100 may control overall operations of the vehicle A. The electronic device 100 may control the sensor 11, the input device 12, the storage 13, the communicator 14, the output device 15, and/or the driving unit 16 of the vehicle A by executing programs stored in the storage 13.

The electronic device 100 may include the information obtainer 110, the operation determiner 120, and the command provider 130 which may be implemented as separate processors, one processor, or any combination thereof. The information obtainer 110, the operation determiner 120, and the command provider 130 may be divided based on functions of the at least one processor, or be configured as one or more elements. Each element may be configured as a software module or a hardware module, or some may be configured as software modules and the others may be configured as hardware modules. The electronic device 100 and the functions of the electronic device 100 are described in detail above, and thus a repeated description is not provided.

The sensor 11 may include a plurality of sensors configured to sense a surrounding environment. For example, the sensor 11 may include at least one of a location sensor (e.g., a global positioning system (GPS), a differential GPS (DGPS), or an inertial navigation system (INS)), an inertial measurement unit (IMU), a lidar sensor, a radar sensor, an image sensor (e.g., a camera, stereo camera, a mono camera, a wide angle camera, an around view camera, or a three-dimensional (3D) vision sensor), an ultrasonic sensor, an infrared sensor, a distance sensor, a temperature/humidity sensor, a red, green, blue (RGB) sensor, or a motion sensor, but is not limited thereto. For example, the sensor 11 may include a barometric pressure sensor or a dust sensor.

According to embodiments, the motion sensor is used to sense motion of the vehicle A, and may include at least one of, for example, a geomagnetic sensor, an acceleration sensor, or a gyroscope sensor, but is not limited thereto. According to an embodiment, the image sensor may include one or a plurality of cameras provided at a plurality of locations inside or outside the vehicle A. For example, three cameras may be provided at a front part of the vehicle A, one camera may be provided at a rear part of the vehicle A, two cameras may be provided at a left part of the vehicle A, and two cameras may be provided at a right part of the vehicle A, but the numbers and the locations of the cameras are not limited thereto. According to an embodiment, the sensor 11 may be configured in an integrated form of an image sensor and a radar sensor, or in an integrated form of an image sensor and a lidar sensor. Functions of the sensors may be intuitively inferred from their names by one of ordinary skill in the art, and thus detailed descriptions thereof will not be provided. The sensor 11 may transmit sensed values to the electronic device 100.

The input device 12 refers to a means used by a user (e.g., a driver or a passenger) to input data to control the vehicle A. For example, the input device 12 may include a keypad, a dome switch, a touchpad (e.g., a capacitive overlay, resistive overlay, infrared beam, surface acoustic wave, integral strain gauge, or piezoelectric touchpad), a jog wheel, or a jog switch, but is not limited thereto. The input device 12 may include a microphone capable of receiving a voice uttered by the user. The microphone may convert analog data corresponding to the voice of the user, into digital data, and provide the digital data to the electronic device 100. The input device 12 may further include a voice recognition module capable of recognizing the voice of the user. The voice recognition module may recognize a user input by using a hidden Markov model (HMM) algorithm, an artificial neural network (ANN) algorithm, or a dynamic time warping (DTW) algorithm. The input device 12 may convert the voice of the user into digital data, and obtain a user utterance intention by applying the converted voice data to the voice recognition module. The input device 12 may provide the obtained user utterance intention to the electronic device 100 as user input information.

The storage 13 may store programs for processing and control operations of the electronic device 100, input/output data (e.g., sensed values, road status information, detailed maps, surrounding area information, and driving routes). The storage 13 may include at least one of flash memory, a hard disk, a multimedia card micro, a memory card (e.g., a secure digital (SD) or extreme digital (XD) card), random access memory (RAM), static RAM (SRAM), read-only memory (ROM), electrically erasable programmable ROM (EEPROM), programmable ROM (PROM), magnetic memory, a magnetic disc, or an optical disc. The vehicle A may use a web storage or a cloud server which performs a storage function on the Internet.

The communicator 14 may include at least one antenna for communicating with another device (e.g., an external vehicle or an external server) in a wireless manner. For example, the communicator 14 may include one or more elements for communication between the vehicle A and an external vehicle or between the vehicle A and a server. For example, the communicator 14 may include at least one of a short-range wireless communicator, a mobile communicator, or a broadcast receiver, but is not limited thereto. The short-range wireless communicator may include, for example, a Bluetooth communicator, a Bluetooth low energy (BLE) communicator, a near field communicator, a wireless local area network (WLAN) (or Wi-Fi) communicator, a Zigbee communicator, an infrared data association (IrDA) communicator, a Wi-Fi direct (WFD) communicator, an ultra-wideband (UWB) communicator, an Ant+ communicator, or a microwave (μ Wave) communicator, but is not limited thereto. The mobile communicator transmits and receives wireless signals to and from at least one of a base station, an external user device, or a server in a mobile communication network. The wireless signals may include various types of data based on transmission and reception of voice call signals, video call signals, or text/multimedia messages. The broadcast receiver may receive broadcast signals and/or broadcast-related information through broadcast channels from outside. The broadcast channels may include satellite channels and terrestrial channels. According to embodiments, the communicator 14 may perform vehicle-to-vehicle (V2V) communication with an external vehicle located within a certain distance from the vehicle A, or perform vehicle-to-infrastructure (V2I) communication with an infrastructure located within a certain distance from the vehicle A. For example, the communicator 14 may broadcast or advertise a packet including vehicle information of the vehicle A. The communicator 14 may receive a packet broadcasted or advertised by an external vehicle.

The output device 15 may be used to output an audio signal, a video signal, or a vibration signal, and include at least one of a display, a sound output device, or a vibrator.

The display may display information processed by the electronic device 100. For example, the display may display a map including a driving route, display driving information, display locations of nearby vehicles, display a driving status, or display notification information for receiving a confirmation for an operating mode or a driving route of the vehicle A, but is not limited thereto. When the display and a touchpad are layered to configure a touchscreen, the display may be used not only as an output device but also as an input device. The display may include at least one of a liquid crystal display (LCD), a thin film transistor-LCD (TFT-LCD), an organic LED (OLED), a flexible display, a 3D display, or an electrophoretic display. According to an embodiment, the display may include a transparent display. The transparent display may be implemented as a transparent LCD display, a transparent thin-film electroluminescent panel (TFEL) display, a transparent OLED display, or a projection display. The projection display refers to a display for projecting an image onto a transparent screen, e.g., a head-up display (HUD).

The sound output device may output audio data received from the communicator 14 or stored in the storage 13. The sound output device may output a sound signal related to a function performed by the vehicle A. For example, the sound output device may output a voice for receiving a confirmation for an operating mode or a driving route of the vehicle A. The sound output device may include, for example, a speaker or a buzzer.

The vibrator may output a vibration signal. For example, the vibrator may output a vibration signal corresponding to output of audio or video data (e.g., an alert message).

The driving unit 16 may include elements used to drive (or operate) the vehicle A. The driving unit 16 may include at least one of a power supply, a driving mechanism, or peripheral devices, but is not limited thereto.

The driving mechanism may include, for example, a brake unit, a steering unit, and a throttle. The brake unit may be a combination of mechanisms configured to decelerate the vehicle A. For example, the brake unit may use friction with wheels/tires to reduce speed. The steering unit may be a combination of mechanisms configured to control a direction of the vehicle A. The throttle may be a combination of mechanisms configured to control the speed of the vehicle A by controlling an operating speed of an engine/motor. The throttle may control power and thrust by regulating the amount of a fuel-air mixture gas supplied into the engine/motor, by using a throttle valve.

The peripheral devices may include a navigation system, lights, signal lights, windshield wipers, internal lighting, a heater, and an air-conditioner. The navigation system may be a system configured to determine a driving route of the vehicle A. The navigation system may be configured to dynamically update the driving route while the vehicle A is driving. For example, the navigation system may use data collected by a GPS module, to determine the driving route of the vehicle A.

According to embodiments, the electronic device 100 may set a driving route of the vehicle A based on information sensed by the sensor 11. The electronic device 100 may control the driving unit 16 based on the set driving route. According to an embodiment, the vehicle A may autonomously change lanes or control speed without intervention of a driver.

According to embodiments, because a driving route of a vehicle may be proactively set in consideration of a traffic congestion status of a monitored area (e.g., an intersection) to which the vehicle is scheduled to drive, the vehicle may rapidly enter the monitored area and a driving route for bypassing the monitored area may be set depending on a situation. When difficulty or consumption of much time is predicted to pass through the monitored area in an autonomous driving mode, the vehicle may adaptively and efficiently drive by recommending a manual driving mode to a driver.

According to embodiments, a driving status or a status of traffic of a road ahead may be provided to nearby vehicles based on, for example, V2V communication. As such, traffic may be improved overall and thus traffic congestion may be rapidly solved.

According to embodiments, because new-type flashers and flashing methods may be used for V2V communication, communication between an autonomous vehicle and a manual vehicle may be enabled in various manners. That is, intuitive and multi-dimensional user experience may be enabled and thus miscommunication between an autonomous vehicle and a manual vehicle may be minimized.

According to embodiments, a method for controlling an autonomous driving of a vehicle may be provided. The method includes identifying a plurality of areas between a location of the vehicle and a monitored area disposed ahead of the vehicle, the plurality of areas include a first area located at a first distance from the monitored area and a second area located at a second distance smaller than the first distance, from the monitored area. For example, the location from which the plurality of areas are designated may be determined based on at least one of a sensing range of a sensory system of the vehicle, e.g., sensors of the vehicle, and a predetermined distance from the monitored area. The method further may include obtaining spatial information around the vehicle, as for example, obtaining a current spatial information about items around the vehicle and a historical information about the plurality of areas and the monitored area. The method further may include, based on the spatial information, setting a first value or a second value being indicative of a greater degree of a traffic congestion at the monitored area than the first value; based on the first value and the vehicle being in one of the first area or the second area, providing a control command for controlling the vehicle to operate in a first operating mode among a plurality of operating modes, the first operating mode being an autonomous operation of the vehicle in which an original driving route of the vehicle through the monitored area is maintained; based on the second value and the vehicle being in the first area, providing a control command for controlling the vehicle to operate in a second operating mode among a plurality of operating modes, the second operating mode being an autonomous driving operation of the vehicle in which the original driving route of the vehicle is modified; and based on the second value and the vehicle being in the second area, providing a control command for controlling the vehicle to operate in one of the second operating mode or to switch to a manual driving operation of the vehicle in which the vehicle is controlled by a driver.

The disclosure is not limited to the above-described effects, and other effects not described above will become apparent to one of ordinary skill in the art from the following descriptions.

As used herein, the term "module" or "unit" may include a unit implemented using hardware, software, or firmware, and be used interchangeably with, for example, the term "logic", "logic block", "component", or "circuit. A module may be an integrated component, or the smallest unit of the component or a part thereof, which performs one or more functions. For example, according to an embodiment, a module may be implemented in the form of an application-specific integrated circuit (ASIC).

Embodiments may be implemented as software (or a program) including one or more instructions stored in a storage medium (e.g., the storage 13 or external memory) readable by a machine (e.g., the electronic device 100). For example, the machine (e.g., the electronic device 100) may fetch at least one instruction among the stored one or more instructions from the storage medium, and execute the same. This enables the machine to perform at least one function based on the fetched at least one instruction. The one or more instructions may include codes produced by a compiler, or codes executable by an interpreter. The storage medium readable by the machine may be provided in the form of a non-transitory storage medium. When a storage medium is 'non-transitory', it means that the storage medium is tangible and does not include signals (e.g., electromagnetic waves), and it does not limit that data is semi-permanently or temporarily stored in the storage medium.

According to an embodiment, the methods according to embodiments may be included and provided in a computer program product. The computer program product may be traded between a seller and a buyer. The computer program product may be distributed in the form of a machine-readable storage medium (e.g., a compact disc-read only memory (CD-ROM)), or be distributed online (e.g., downloaded or uploaded) through an application store (e.g., Google Play™) or directly between two user devices (e.g., smartphones). When distributed online, at least a part of the computer program product may be at least temporarily stored or created in a machine-readable storage medium such as a server of a manufacturer, a server of an application store, or memory of a relay server.

According to embodiments, each of the above-described elements (e.g., modules or programs) may be provided in a singular or plural number. According to embodiments, one or more of the above-described elements, or operations thereof may be omitted, or one or more other elements or operations thereof may be added. Alternatively or additionally, a plurality of elements (e.g., modules or programs) may be integrated into one element. In this case, the integrated element may equally or similarly perform one or more functions of each of the plurality of individual elements before being integrated. According to embodiments, operations of modules, programs, or other elements may be performed sequentially, in parallel, repeatedly, or heuristically, one or more of the operations may be omitted or be performed in a different order, or one or more other operations may be added.

What is claimed is:

1. A method, performed by an electronic device, of assisting driving of a vehicle, the method comprising:
    obtaining first surrounding area information of the vehicle based on the vehicle being located at a first distance from a monitored area disposed ahead of the vehicle;
    providing a first control command for controlling the vehicle to operate in a first operating mode among a plurality of operating modes, based on a first congestion value of the monitored area that is obtained by using the first surrounding area information, the first operating mode comprising a first driving mode for driving along a first driving route set to enter the monitored area and a second driving mode for driving along a modified first driving route set to bypass the monitored area;
    based on the vehicle having been driven toward the monitored area according to the first congestion value being smaller than a first preset value, obtaining second surrounding area information of the vehicle based on the vehicle being located at a second distance less than the first distance from the monitored area; and
    providing a second control command for changing the first operating mode to a second operating mode among the plurality of operating modes and for controlling the vehicle to operate in the second operating mode, based on a second congestion value of the monitored area that is obtained by using the second surrounding area information, the second operating mode comprising the first driving mode for driving along the first driving route set to enter the monitored area, the second driving mode for driving along the modified first driving route set to bypass the monitored area, and a third driving mode for waiting to enter the monitored area.

2. The method of claim 1, wherein the providing the first control command comprises:
    providing the first control command for controlling the vehicle to operate in an autonomous driving mode for driving along one of the first driving route set to enter the monitored area or a second driving route set to bypass the monitored area.

3. The method of claim 1, wherein the providing the second control command comprises:
    providing the second control command for controlling the vehicle to operate in one of an autonomous driving mode or a driver driving mode in which the vehicle is driven by a driver.

4. The method of claim 1, wherein the providing the second control command comprises:
    providing the second control command for controlling the vehicle to operate in an autonomous driving mode for one of driving along the first driving route set to enter the monitored area, waiting to enter the monitored area, or driving along a second driving route set to bypass the monitored area.

5. The method of claim 1, further comprising obtaining location information of the vehicle,
    wherein the providing the first control command comprises providing the first control command for controlling the vehicle to operate in the first operating mode, by using the first surrounding area information and the location information.

6. The method of claim 1, further comprising obtaining a driving history of the vehicle,
    wherein the providing the first control command comprises providing the first control command for controlling the vehicle to operate in the first operating mode, by using the first surrounding area information and the driving history.

7. The method of claim 1, further comprising dividing at least a part of a distance from the monitored area to the vehicle into a plurality of areas based on a sensing range of the vehicle,
    wherein the obtaining the first surrounding area information comprises obtaining the first surrounding area information when the first distance at which the vehicle is located from the monitored area is in a first area among the plurality of areas, and
    wherein the obtaining the second surrounding area information comprises obtaining the second surrounding area information when the second distance at which the vehicle is located from the monitored area is in a second area among the plurality of areas.

8. The method of claim 1, further comprising providing notification information indicating that the vehicle operates in one of the first operating mode or the second operating mode.

9. The method of claim 1, wherein each of the first surrounding area information and the second surrounding area information comprises at least one of traffic signal information of a traffic light at the monitored area, driving information of nearby vehicles, or traffic sign information of a traffic sign near the vehicle.

10. The method of claim 1, wherein the providing the first control command for controlling the vehicle to operate in the first operating mode further comprises providing the first control command for driving along the first driving route based on the first congestion value being smaller than the first preset value and for driving along the modified first driving route based on the first congestion value being equal to or greater than the first preset value, and the providing the second control command for controlling the vehicle to operate in the second operating mode further comprises providing the second control command for driving along the first driving route based on the second congestion value being smaller than the first preset value, for waiting to enter the monitored area based on the second congestion value being equal to or greater than the first preset value and smaller than a second preset value, and for driving along the modified first driving route based on the second congestion value being equal to or greater than the second preset value.

11. An electronic device comprising:
a memory storing instructions; and
at least one processor configured to execute the instructions to:
obtain first surrounding area information of a vehicle based on the vehicle being located at a first distance from a monitored area disposed ahead of the vehicle,
provide a first control command for controlling the vehicle to operate in a first operating mode among a plurality of operating modes, based on a first congestion value of the monitored area that is obtained by using the first surrounding area information, the first operating mode comprising a first driving mode for driving along a first driving route set to enter the monitored area and a second driving mode for driving along a modified first driving route set to bypass the monitored area,
based on the vehicle having been driven toward the monitored area according to the first congestion value being smaller than a first preset value, obtain second surrounding area information of the vehicle based on the vehicle being located at a second distance less than the first distance from the monitored area, and
provide a second control command for changing the first operating mode to a second operating mode among the plurality of operating modes and for controlling the vehicle to operate in the second operating mode, based on a second congestion value of the monitored area that is obtained by using the second surrounding area information, the second operating mode comprising the first driving mode for driving along the first driving route set to enter the monitored area, the second driving mode for driving along the modified first driving route set to bypass the monitored area, and a third driving mode for waiting to enter the monitored area.

12. The electronic device of claim 11, wherein the at least one processor is further configured to execute the instructions to provide the first control command for controlling the vehicle to operate in an autonomous driving mode for driving along one of the first driving route set to enter the monitored area or a second driving route set to bypass the monitored area.

13. The electronic device of claim 11, wherein the at least one processor is further configured to execute the instructions to provide the second control command for controlling the vehicle to operate in one of an autonomous driving mode or a driver driving mode in which the vehicle is driven by a driver.

14. The electronic device of claim 11, wherein the at least one processor is further configured to execute the instructions to provide the second control command for controlling the vehicle to operate in an autonomous driving mode for one of driving along the first driving route set to enter the monitored area, waiting to enter the monitored area, or driving along a second driving route set to bypass the monitored area.

15. The electronic device of claim 11, wherein the at least one processor is further configured to execute the instructions to:
obtain location information of the vehicle, and
provide the first control command for controlling the vehicle to operate in the first operating mode, by using the first surrounding area information and the location information.

16. The electronic device of claim 11, wherein the at least one processor is further configured to execute the instructions to:
obtain a driving history of the vehicle, and
provide the first control command for controlling the vehicle to operate in the first operating mode, by using the first surrounding area information and the driving history.

17. The electronic device of claim 11, wherein the at least one processor:
is further configured to execute the instructions to provide notification information indicating that the vehicle operates in one of the first operating mode or the second operating mode.

18. The electronic device of claim 11, wherein each of the first surrounding area information and the second surrounding area information comprises:
at least one of traffic signal information of a traffic light at the monitored area, driving information of nearby vehicles, or traffic sign information of a traffic sign near the vehicle.

19. A computer program product comprising a computer-readable non-transitory storage medium storing instructions, which, when executed by a processor, cause the processor to control an electronic device to:
obtain first surrounding area information of a vehicle based on the vehicle being located at a first distance from a monitored area disposed ahead of the vehicle,
provide a first control command for controlling the vehicle to operate in a first operating mode among a plurality of operating modes, based on a first congestion value of the monitored area that is obtained by using the first surrounding area information, the first operating mode comprising a first driving mode for driving along a first driving route set to enter the monitored area and a second driving mode for driving along a modified first driving route set to bypass the monitored area,
based on the vehicle having been driven toward the monitored area according to the first congestion value being smaller than a first preset value, obtain second surrounding area information of the vehicle based on the vehicle being located at a second distance less than the first distance from the monitored area, and
provide a second control command for changing the first operating mode to a second operating mode among the plurality of operating modes and for controlling the vehicle to operate in the second operating mode, based on a second congestion value of the monitored area that is obtained by using the second surrounding area information, the second operating mode comprising the first driving mode for driving along the first driving route set to enter the monitored area, the second driving mode for driving along the modified first driving route set to bypass the monitored area, and a third driving mode for waiting to enter the monitored area.

* * * * *